US009946049B2

(12) United States Patent
Kim et al.

(10) Patent No.: US 9,946,049 B2
(45) Date of Patent: *Apr. 17, 2018

(54) LENS MOVING APPARATUS AND CAMERA MODULE INCLUDING THE SAME

(71) Applicant: LG INNOTEK CO., LTD., Seoul (KR)

(72) Inventors: Jung Cheol Kim, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,205

(22) Filed: Jan. 27, 2017

(65) Prior Publication Data

US 2017/0139179 A1 May 18, 2017

Related U.S. Application Data

(63) Continuation of application No. 14/823,596, filed on Aug. 11, 2015, now Pat. No. 9,575,329.

(30) Foreign Application Priority Data

Aug. 14, 2014 (KR) ........................ 10-2014-0105682

(51) Int. Cl.
*G02B 7/09* (2006.01)
*H02K 41/035* (2006.01)
(Continued)

(52) U.S. Cl.
CPC ................ *G02B 7/09* (2013.01); *G02B 7/08* (2013.01); *G02B 27/646* (2013.01); *G03B 3/10* (2013.01); *G03B 13/36* (2013.01); *H02K 41/0356* (2013.01); *H04N 5/2254* (2013.01); *H04N 5/23212* (2013.01)

(58) Field of Classification Search
CPC .......... G02B 7/09; G02B 7/08; G02B 27/646; H02K 41/0356; G03B 3/10; G03B 13/36; H04N 5/2254; H04N 5/23212
See application file for complete search history.

(56) References Cited

U.S. PATENT DOCUMENTS 5,471,100 A 11/1995 Sakamoto
7,881,598 B1 2/2011 Wu
(Continued)

OTHER PUBLICATIONS

Notice of Allowance dated Oct. 6, 2016 in U.S. Appl. No. 14/823,596.

*Primary Examiner* — Padma Haliyur
(74) *Attorney, Agent, or Firm* — Saliwanchik, Lloyd & Eisenschenk

(57) ABSTRACT

An embodiment includes a housing including a guide protrusion projecting from an upper surface thereof and a guide groove formed adjacent to the guide protrusion, a first magnet disposed at the housing, a bobbin on which a lens is mounted, a first coil disposed on an outer circumferential surface of the bobbin to move the bobbin by interaction with the first magnet, an upper elastic member coupled to the bobbin and the housing and having an end disposed in the guide groove, a damping member disposed between a side surface of the guide protrusion and a first end of the upper elastic member disposed in the guide groove, and a second coil for moving the housing by interaction with the first magnet.

7 Claims, 23 Drawing Sheets

(51) Int. Cl.
  *G02B 27/64*     (2006.01)
  *G03B 13/36*     (2006.01)
  *H04N 5/232*     (2006.01)
  *G02B 7/08*      (2006.01)
  *H04N 5/225*     (2006.01)
  *G03B 3/10*      (2006.01)

(56)     References Cited

U.S. PATENT DOCUMENTS

| | | |
|---|---|---|
| 7,936,526 B2 | 5/2011 | Park |
| 2012/0229901 A1 | 9/2012 | Moriya |
| 2013/0182325 A1 | 7/2013 | Minamisawa |

LENS MOVING APPARATUS AND CAMERA MODULE INCLUDING THE SAME

CROSS REFERENCE TO RELATED APPLICATIONS

This application is a continuation of U.S. application Ser. No. 14/823,596, filed Aug. 11, 2015, which claims the benefit under 35 U.S.C. § 119 to Korean Patent Application No. 10-2014-0105682, filed Aug. 14, 2014, which is herein incorporated by reference in its entirety.

TECHNICAL FIELD

Embodiments relate to a lens moving apparatus and a camera module including the same.

BACKGROUND

It is difficult to adopt a voice coil motor (VCM) technology, which is typically used in conventional camera modules, for use in an ultracompact camera module, which aims at achieving low power consumption, and thus research regarding the technology has been actively undertaken.

Generally, a camera module may include a lens, an image sensor module, and a voice coil motor (VCM) for adjusting the interval between the lens and the image sensor module. In this regard, in order to correct the distortion of images or moving images caused by the trembling of a user's hand, voice coil motors incorporating optical image stabilizers (OIS) are being developed.

BRIEF SUMMARY

Embodiments provide a lens moving apparatus capable of increasing the controllable contact area of damping members disposed between an upper elastic member and a housing, thus ensuring an accurate autofocusing operation.

In one embodiment, a lens moving apparatus includes a housing including a guide protrusion projecting from an upper surface thereof and a guide groove formed adjacent to the guide protrusion, a first magnet disposed at the housing, a bobbin on which a lens is mounted, a first coil disposed on an outer circumferential surface of the bobbin to move the bobbin by interaction with the first magnet, an upper elastic member coupled to the bobbin and the housing and having an end disposed in the guide groove, a damping member disposed between a side surface of the guide protrusion and a first end of the upper elastic member disposed in the guide groove, and a second coil for moving the housing by interaction with the first magnet.

The first end of the upper elastic member may include a damping contact bent in a first direction, and the damping member may be disposed between the damping contact and the side surface of the guide protrusion.

The first end of the upper elastic member may be spaced apart from a bottom of the guide groove.

The guide protrusion may have an upper surface positioned higher than an upper surface of the housing.

The guide groove may be recessed from the upper surface of the housing and opens inward into and outward from the housing.

The upper elastic member may include first to nth upper elastic members which are separated (where n is a natural number satisfying N>1), wherein the housing may include n guide protrusions (where n is a natural number satisfying N>1), first guide grooves formed in first sides of the n guide protrusions, and second guide grooves formed in second sides of the n guide protrusions, and wherein each of the first to nth upper elastic members may have first and second ends disposed in a corresponding one of the first and second guide grooves.

The guide protrusion may project from a bottom of the groove formed in the upper surface of the housing, and wherein the first guide groove may be formed at a first side of the guide protrusion and the second guide groove may be formed in a second side of the guide protrusion.

The first and second guide grooves may be symmetric with respect to the guide protrusion and may be connected the side surfaces of the guide protrusion.

The upper elastic member may include an inner frame coupled to the bobbin, an outer frame coupled to the housing and a connecting portion connecting the inner frame to the outer frame, and the first end of the upper elastic member disposed in the guide groove is one end of the inner frame.

The housing may include first and second guide protrusions, a first guide groove formed in a first side of the first guide protrusion, a second guide groove formed in a second side of the first guide protrusion, a third guide groove formed in a first side of the second guide protrusion, and a fourth guide groove formed in a second side of the second guide protrusion, wherein the upper elastic member may include first and second upper elastic members, which are separated from each other, and wherein each of the first ends of the first and second upper elastic members may be disposed in a corresponding one of the first and second guide grooves, and each of the second ends of the first and second upper elastic members is disposed in a corresponding one of the third and fourth guide grooves.

Each of the first and second upper elastic members may include an inner frame coupled to the bobbin, an outer frame coupled to the housing, and a connecting portion connecting the inner frame to the outer frame, wherein first and second ends of the inner frame of the first upper elastic member may include first and second damping contacts projecting in a first direction, and first and second ends of the inner frame of the second upper elastic member include third and fourth damping contacts projecting in the first direction, and wherein the damping member may include damping members disposed between side surfaces of the first and second guide protrusions and the first to fourth damping contacts.

The lens moving apparatus may further include a plurality of elastic support members disposed at a side surface to support the housing.

Each of the plurality of elastic support members may include first and second support members, which are separated from each other and disposed at the same side surface of the housing, and power may be supplied to the first coil through the first and second support members of one of the plurality of elastic support members.

In another embodiment, a lens moving apparatus includes a housing including first and second guide protrusions projecting from an upper surface thereof and spaced apart from each other, a first magnet disposed at the housing, a bobbin on which a lens is mounted, a first coil disposed on an outer circumferential surface of the bobbin to move the bobbin by interaction with the first magnet, first and second upper elastic members coupled to the bobbin and the housing and separated from each other by the first and second guide protrusions, damping members disposed between side surfaces of the first and second guide protrusion and first ends and second ends of each of the first and second upper elastic members, and a second coil for moving the housing by interaction with the first magnet.

Each of the first and second guide protrusions may include a first stepped portion projecting from a first side surface thereof, and a second stepped portion projecting from a second side surface thereof, and wherein the damping members may be disposed between the first and second side surfaces of the first and second guide protrusions and the first or second ends of the first and second upper elastic members, and the first and second side surfaces may be opposite side surfaces of each of the first and second guide protrusions.

The first and second ends of each of the first and second upper elastic members may include damping contacts bent upward, and the damping members may be disposed between the damping contacts and the side surfaces of the first and second guide protrusions.

The housing may further include guide grooves formed in first and second sides of each of the first and second guide protrusions, and each of the damping contacts may be disposed at a corresponding one of the guide grooves.

The first and second ends of each of the first and second upper elastic members may be provided with a first recess, into which the first stepped portion is fitted, and a second recess, into which the second stepped portion is fitted, respectively.

The first stepped portion may include a first stepped surface connected to the first side surface, and the second stepped portion includes a second stepped surface connected to the second side surface, wherein the damping members may contact the first and second stepped surfaces.

In a further embodiment, a camera module includes an image sensor, a printed circuit board on which the image sensor is mounted, and the lens moving apparatus.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
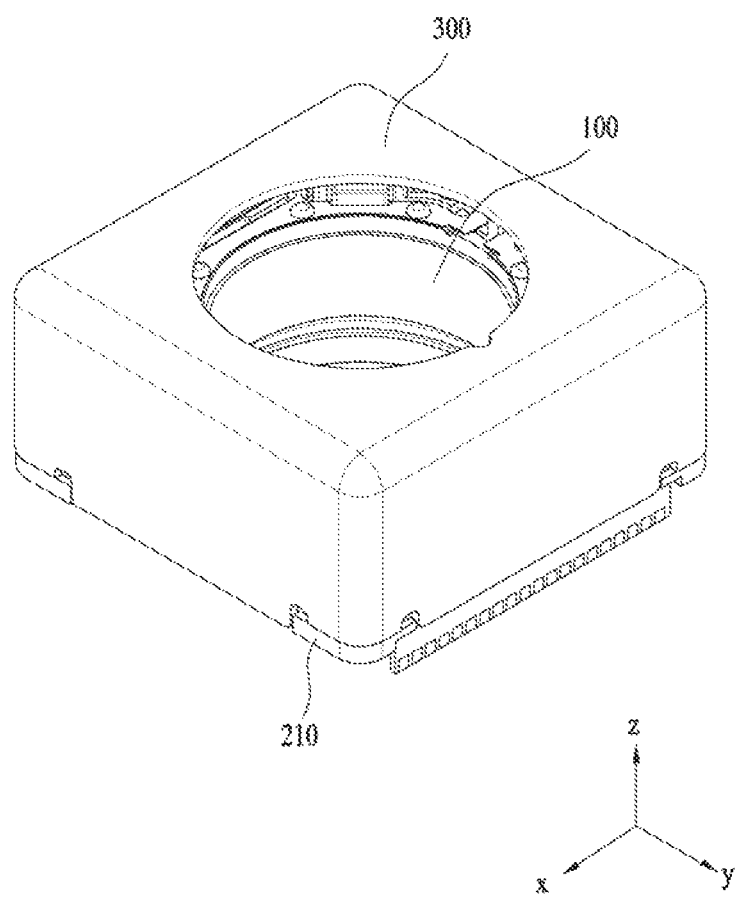
FIG. 1 is a schematic perspective view showing a lens moving apparatus according to an embodiment.

Embodiments will become apparent from the following description of preferred embodiments with reference to the accompanying drawings. In the following description of embodiments, it will be understood that, when a layer (film), a region, a pattern or a structure is referred to as being 'on' or 'under' another element, it can be directly on/under the element, or one or more intervening elements may also be present therebetween. Here, the reference regarding 'on' or 'under' an element should be defined based on the drawings.

It should be understood that the elements shown in the drawings may be exaggerated in size or omitted for convenience and clarity of the explanation. Furthermore, it should be understood that the elements shown in the drawings are not drawn to scale, and the same reference numbers used throughout the different figures designate the same or similar components.

Hereinafter, a lens moving apparatus will now be described with reference to the accompanying drawings. Although the lens moving apparatus according to the embodiments is described with reference to Cartesian coordinates (x, y, z) for reference, the lens moving apparatus may be described with reference to other coordinates, and the embodiment is not limited thereto. In the respective drawings, the x-axis and the y-axis indicate a plane perpendicular to the z-axis, which is the optical axis. The z-axis direction, which is the optical direction, may be referred to as a "first direction", the x-axis direction may be referred to as a "second direction", and the y-axis direction may be referred to as a "third direction".

An optical image stabilizing apparatus, which is applied to compact camera modules of mobile devices such as smart phones or tablet PCs, refers to an apparatus configured to prevent the contour f an image captured upon still image shooting from not being clearly formed due to vibrations caused by the trembling of user's hand.

In addition, an autofocusing apparatus is configured to automatically focus the subject image on the surface of an image sensor. The optical image stabilizing apparatus and the autofocusing apparatus may be configured in various manners. The lens moving apparatus according to the embodiments may perform the optical image stabilizing and/or autofocusing operations in such a manner as to move an optical module composed of a plurality of lenses in a first direction or in a plane defined by second and third directions perpendicular to the first axis.

Figure 2:
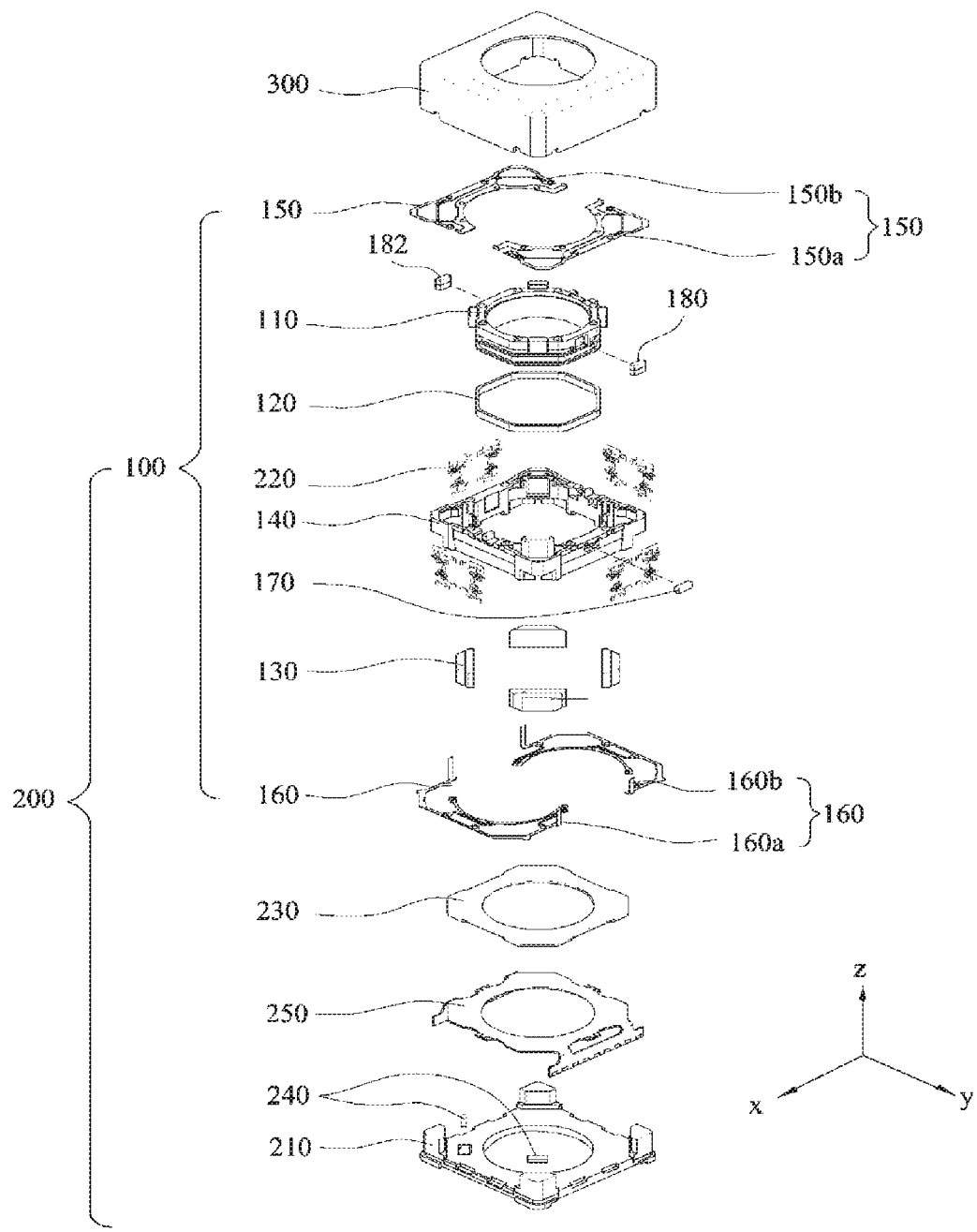
FIG. 2 is an exploded perspective view of the lens moving apparatus shown in FIG. 1.

FIG. 1 is a schematic perspective view showing a lens moving apparatus according to an embodiment. FIG. 2 is an exploded perspective view of the lens moving apparatus shown in FIG. 1.

Referring to FIGS. 1 and 2, the lens moving apparatus according to the embodiment may include a first lens moving unit 100, a second lens moving unit 200, and a cover member 300. The first lens moving unit 100 may serve as the above-mentioned autofocusing apparatus, and the second lens moving unit 200 may serve as the above-mentioned optical image stabilizing apparatus.

The cover member 300 may be configured to have an approximate box shape and to surround the first and second lens moving units 100 and 200.

Figure 3:
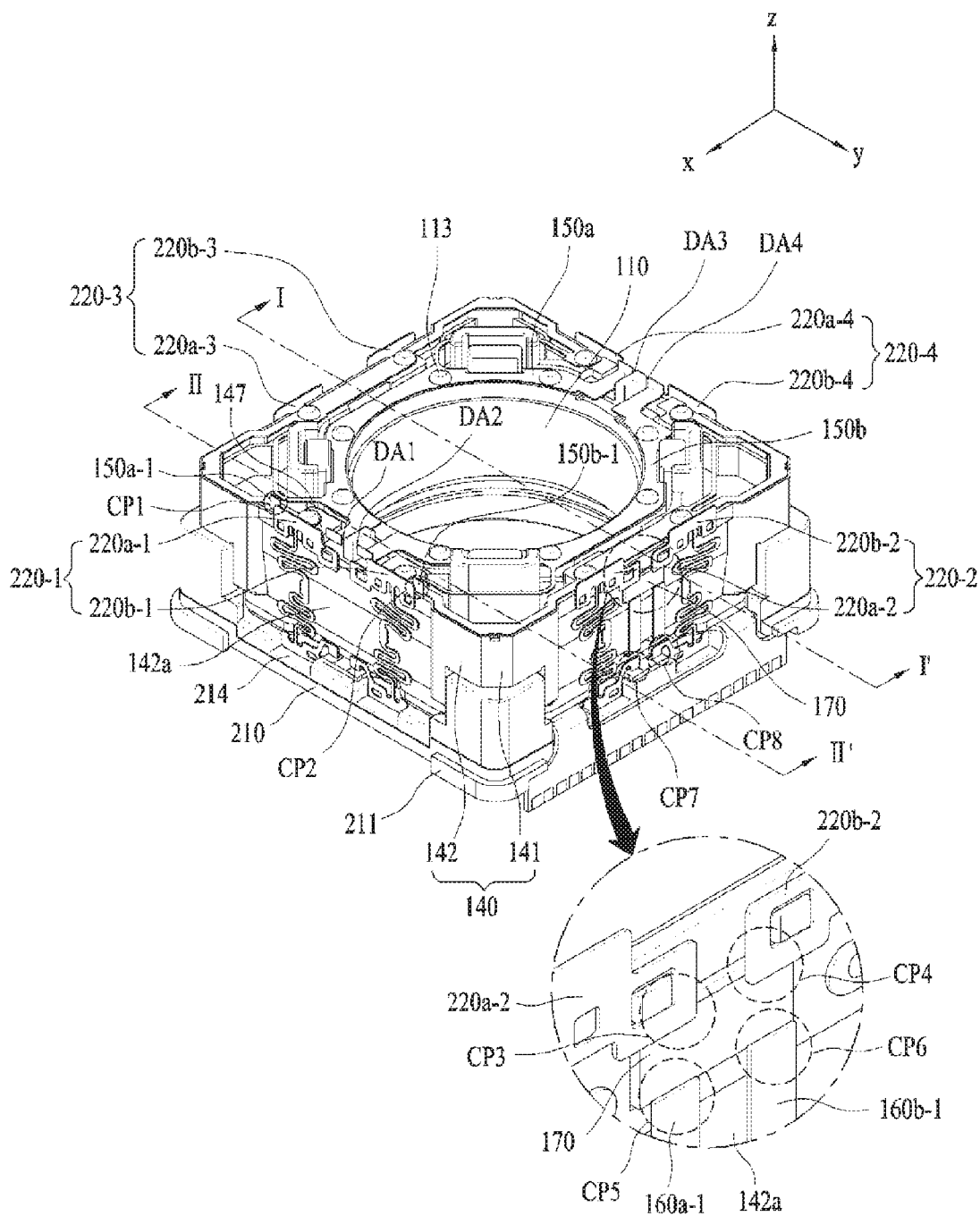
FIG. 3 is a perspective view of the lens moving apparatus according to the embodiment from which a cover member shown in FIGS. 1 and 2 has been removed.
Figure 11:
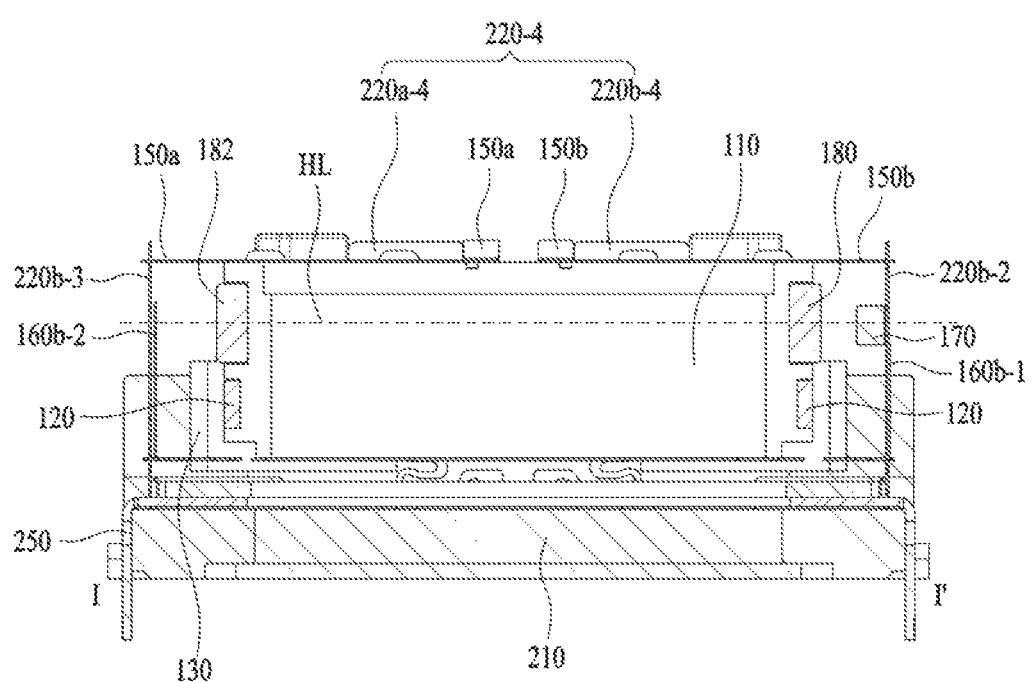
FIG. 11 is a cross-sectional view taken along line I-I' of FIG. 3.
Figure 17:
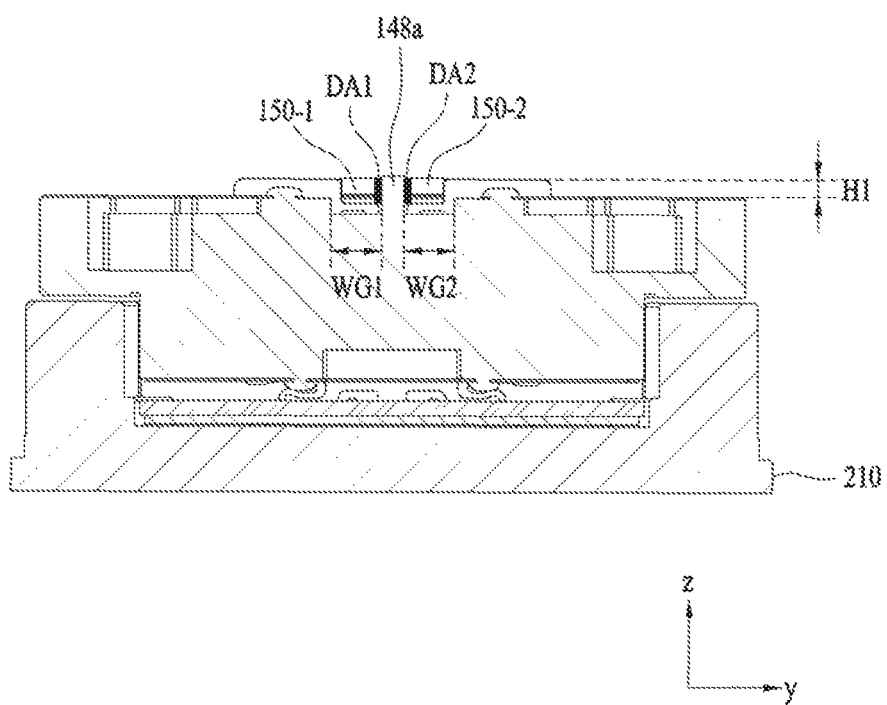
FIG. 17 is a cross-sectional view taken along of FIG. 3.

FIG. 3 is a perspective view of the lens moving apparatus according to the embodiment from which the cover member 300 shown in FIGS. 1 and 2 has been removed. FIG. 11 is a cross-sectional view taken along line I-I' of FIG. 3. FIG. 17 is a cross-sectional view taken along line II-II' of FIG. 3. For the convenience of explanation, the illustration of a housing 140 is omitted in FIG. 11.

The first lens moving unit 100 may include a bobbin 110, a first coil 120, a first magnet 130, the housing 140, an upper elastic member 150, a lower elastic member 160, and damping members DA. The first lens moving unit 100 may further include a first position sensor 170 and a second magnet 180. In addition, the first lens moving unit 100 may further include a magnetic field compensation metal member 182.

Although elastic support members 220 are illustrated in FIG. 2 as being included in the first lens moving unit 100, the elastic support members 220 may also be included in the second lens moving unit 200, from a functional viewpoint. The elastic support members 220 will be described in detail at the time of explanation of the second lens moving unit 200.

Figure 4:
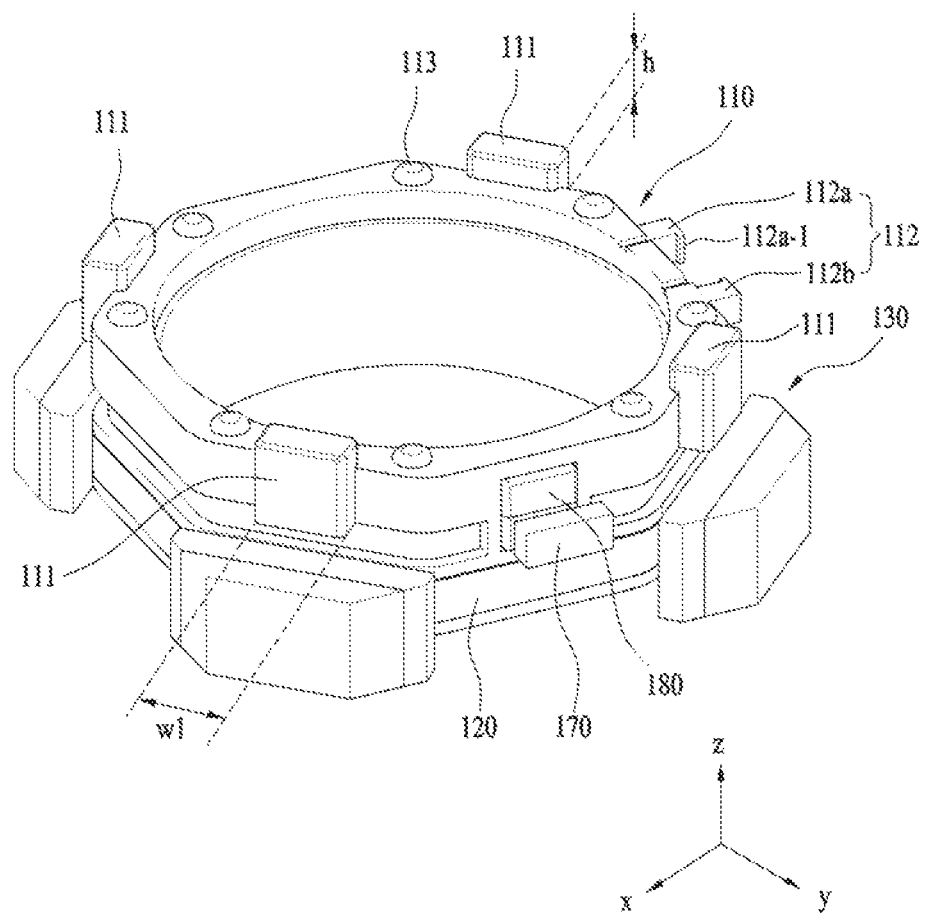
FIG. 4 is a perspective view showing the assembled construction of a bobbin, a first coil, a first magnet, a first position sensor, and a second magnet.

FIG. 4 is a perspective view showing the assembled construction of the bobbin 110, the first coil 120, the first magnet 130, the first position sensor 170, and the second magnet 180.

Figure 5:
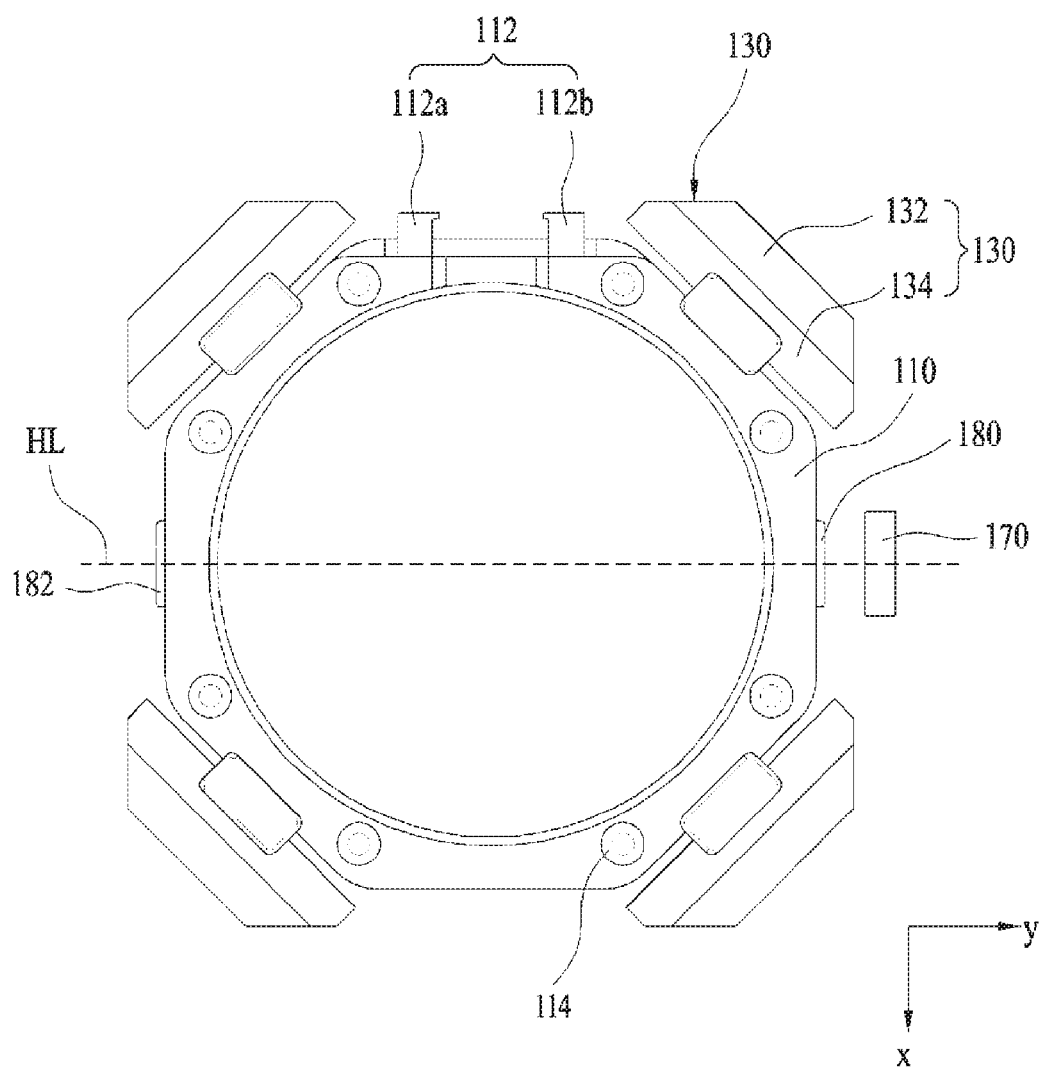
FIG. 5 is a plan view showing the assembled construction of the bobbin, the first magnet, the first position sensor, the second magnet, and a magnetic field compensation metal member.

FIG. 5 is a plan view showing the assembled construction of the bobbin 110, the first magnet 130, the first position sensor 170, the second magnet 180, and the magnetic field compensation metal member 182.

Referring to the above-mentioned drawings, the bobbin 110 may be installed in the housing 140 such that it reciprocates in a direction parallel to the first direction, which is the optical axis direction, and may be configured to have a hollow structure for accommodating the lens or lens barrel. The hollow of the bobbin 110 may be determined in accordance with the shape of the lens or lens barrel. For example, the hollow of the bobbin 110 may have a circular, elliptic or polygonal shape.

As shown in FIG. 4, the first coil 120 is mounted on the outer circumferential surface of the bobbin 110 so as to allow the first coil 120 and the first magnet 130 to electromagnetically interact with each other. To this end, the first magnet 130 may be disposed around the bobbin 110 so as to face the first coil 120.

When the bobbin 110 performs the upward and/or downward movement in the direction parallel to the optical axis to implement the autofocusing function, the bobbin 110 may be flexibly supported by the upper and lower elastic members 150 and 160.

Although not shown in the drawings, the bobbin 110 may include at the inner surface thereof the lens barrel (not shown), in which at least one lens may be installed. The lens barrel may be installed in the bobbin 110 in various ways.

For example, the lens barrel may be coupled to the bobbin 110 in such a way as to form a female threaded portion on the inner surface of the bobbin 110, form a male threaded portion corresponding to the female threaded portion on the outer surface of the lens barrel, and cause the female and male threaded portions to engage with each other. However, the embodiment is not limited thereto.

Alternatively, the lens barrel may be directly secured in the bobbin 110 by ways other than the threaded engagement, or one or more lenses may be integrally formed with the bobbin 110 without the lens barrel. The lens coupled to the lens barrel may be composed of a single lens, or may be composed of two or more lenses constituting an optical system.

The bobbin 110 may include first stoppers 111 and winding protrusions 112.

When the bobbin 110 moves in the first direction parallel to the optical axis, to fulfill the autofocusing function, the first stoppers 111 may prevent the body of the bobbin 110 from directly colliding with the inner surface of the cover member 300 shower in FIG. 1, even if the bobbin 110 moves beyond the specified range.

As shown in FIG. 4, the first stoppers 111 may be disposed on the lateral side surface of the bobbin 110, and may project upward from the upper surface of the bobbin 110 by a first height h1.

The number of stoppers 111 may be a plural number, for example, four, and the plurality of first stoppers 111 may be disposed spaced apart from one another. For example, although each of the stoppers 111 may have a polygonal column shape, the embodiment is not limited thereto. Furthermore, the plurality of first stoppers 111 may be symmetrically disposed with respect to the center of the bobbin 110, as shown in the drawings, or they may also be asymmetrically disposed so as not to interfere with other components.

The first stoppers 111 may be configured to project upward from the upper surface of the bobbin 110 as well as to project radially from the lateral side surface of the bobbin 110. For example, the first stoppers 111 may be disposed on the corners where the upper surface of the bobbin 110 meets the lateral side surface of the bobbin 110.

As described later with reference to FIG. 6, the first stoppers 111 may be fitted in first mounting recesses 1464 provided in the housing 140. Accordingly, even if a force is exerted on the bobbin 110 in a rotational direction about the optical axis, it is possible to prevent the rotation of the bobbin 110 by virtue of the first stoppers 111 fitted in the first mounting recesses 146-1.

The winding protrusions 112 may project from the upper and outer circumferential surface of the bobbin 110, and the first coil 120 may be wound therearound, as will be described later. Although FIG. 4 illustrates two winding protrusions, the embodiment is not limited thereto. Each of the two winding protrusions may be wound with one of the starting line and the ending line, which are both ends of the first coil 120.

The winding protrusions 112 may project from the lateral side surface of the bobbin 110, and may be fitted in second mounting recesses 146-2 provided in the housing 140, or may be supported by the second mounting recesses 146-2.

When the bobbin 110 moves in the first direction, parallel to the optical axis, to fulfill the autofocusing function, the winding protrusions 112 and the second mounting recesses 146-2 may prevent the bottom surface of the bobbin 110 from directly colliding with the upper surfaces of a base 210 and a circuit board 250, even though the bobbin 110 moves beyond the specified range due to the application of external shocks.

Figure 6:
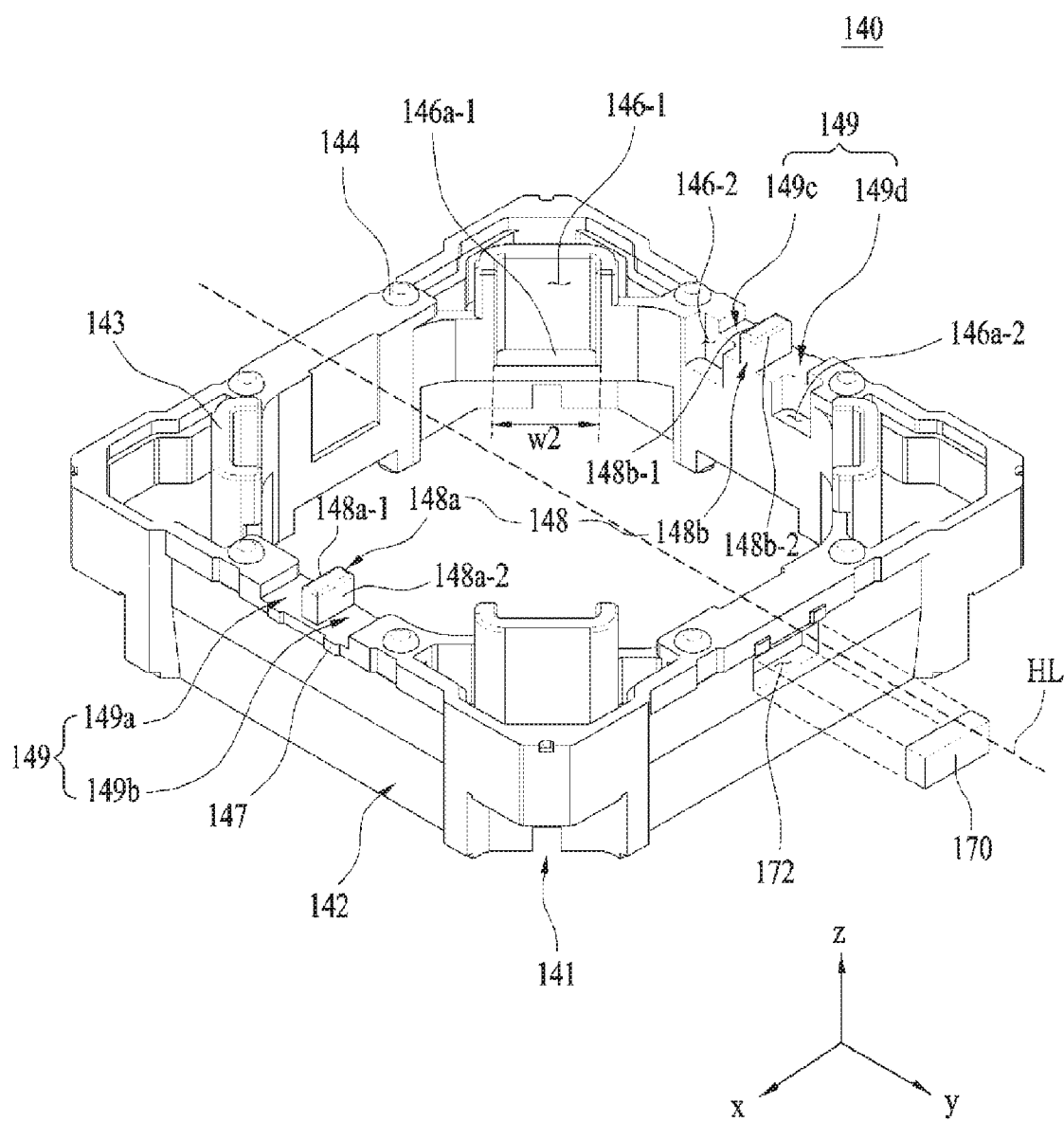
FIG. 6 is an exploded perspective view of a housing and the first position sensor according to the embodiment.
Figure 7:
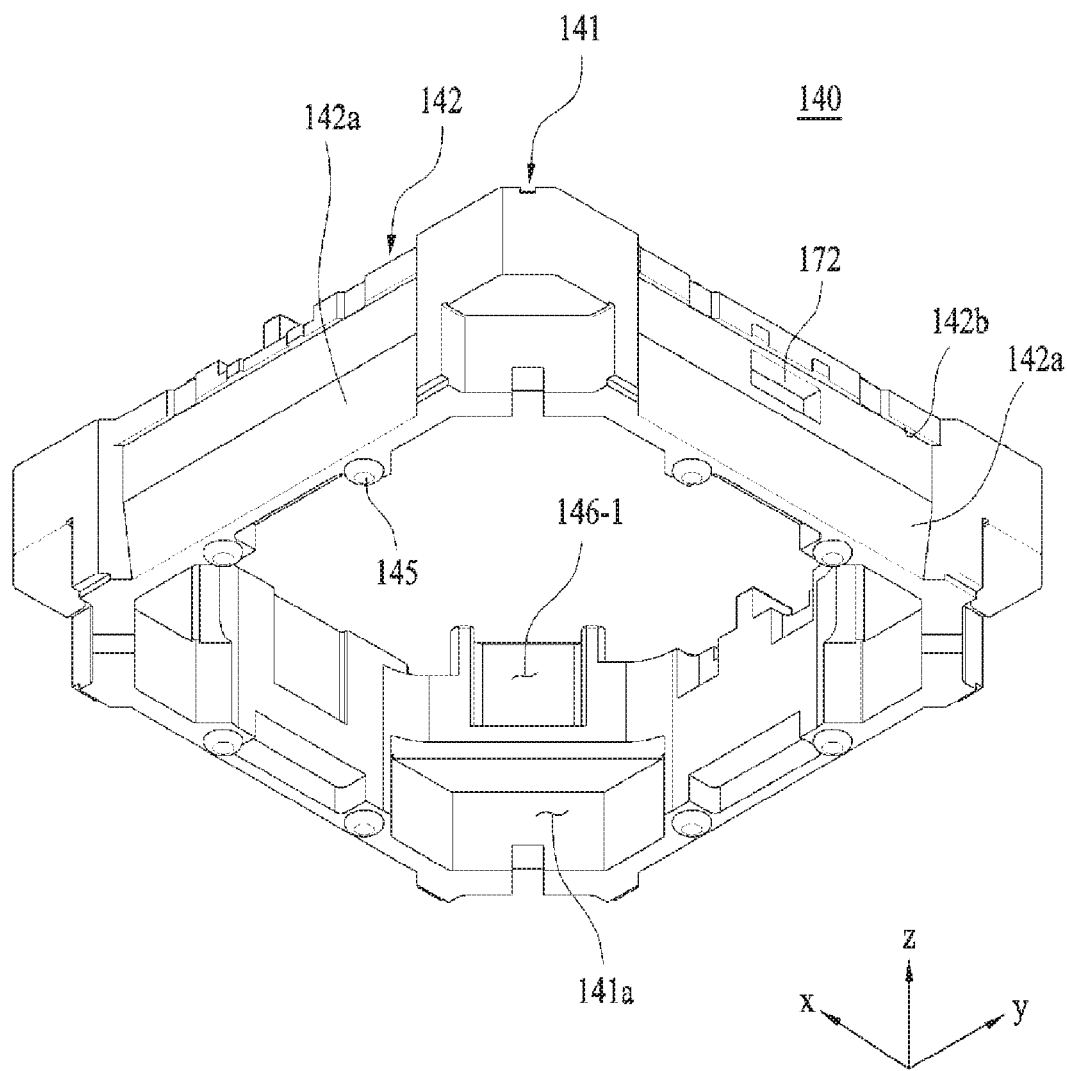
FIG. 7 is a rear perspective view of the housing according to the embodiment.

FIG. 6 is an exploded perspective view of the housing 140 and the first position sensor 170 according to the embodiment. FIG. 7 is a rear perspective view of the housing 140 according to the embodiment.

Referring to FIGS. 6 and 7, when the position at which the first stoppers 111 contact first bottom surfaces 146a-1 of the first mounting recesses 146-1 is set to be the initial position of the bobbin 110, the autofocusing function may be controlled as in unidirectional control of a conventional voice coil motor (VCM). Alternatively, when the position at which the winding protrusions 112 contact the second bottom surfaces 146a-2 of the second mounting recesses 146-2 by a predetermined distance is set to be the initial position of the bobbin 110, the autofocusing function may be controlled as in unidirectional control of a conventional voice coil motor. In other words, the autofocusing function may be implemented by an operation in which the bobbin 110 moves upward when current is supplied to the first coil 120 and moves downward when the supply of current to the first coil 120 is halted.

However, when the position at which the first stoppers 111 are spaced apart from the first bottom surfaces 146a-1 of the first mounting recesses 146-1 by a predetermined distance is set to be the initial position of the bobbin 110, the autofocusing function may be controlled depending on the direction of current, as in bidirectional control of the voice coil motor. Alternatively, when the position at which the winding protrusions 112 are spaced apart from the second bottom surfaces 146a-2 of the second mounting recesses 146-2 by a predetermined distance is set to be the initial position of the bobbin 110, the autofocusing function may be controlled, as in bidirectional control of a conventional voice coil motor. In other words, the autofocusing function may be implemented by an operation in which the bobbin 110 moves upward or downward in the direction parallel to the optical axis. For example, the bobbin 110 may move upward when current is applied in the forward direction, and may move downward when current is applied in the reverse direction.

The first mounting recesses 146-1 of the housing 140, which correspond to the first stoppers 111, may be recessed. In this regard, there may be a certain tolerance between a first width w1 of the first stoppers 111 shown in FIG. 4 and a second width w2 of the first. mounting recesses 1464 shown in FIG. 6.

As a result, it is possible to restrict the rotation of the first stoppers in the first mounting recesses 146-1. In other words, even though the bobbin 110 is subjected to a force exerted in the rotational direction about the optical axis rather than in the direction of the optical axis, the first stoppers 111 and the first mounting recesses 146-1 may prevent rotation of the bobbin 110. This function of the first stoppers 111 may also be implemented by the winding protrusions 112.

Figure 8:
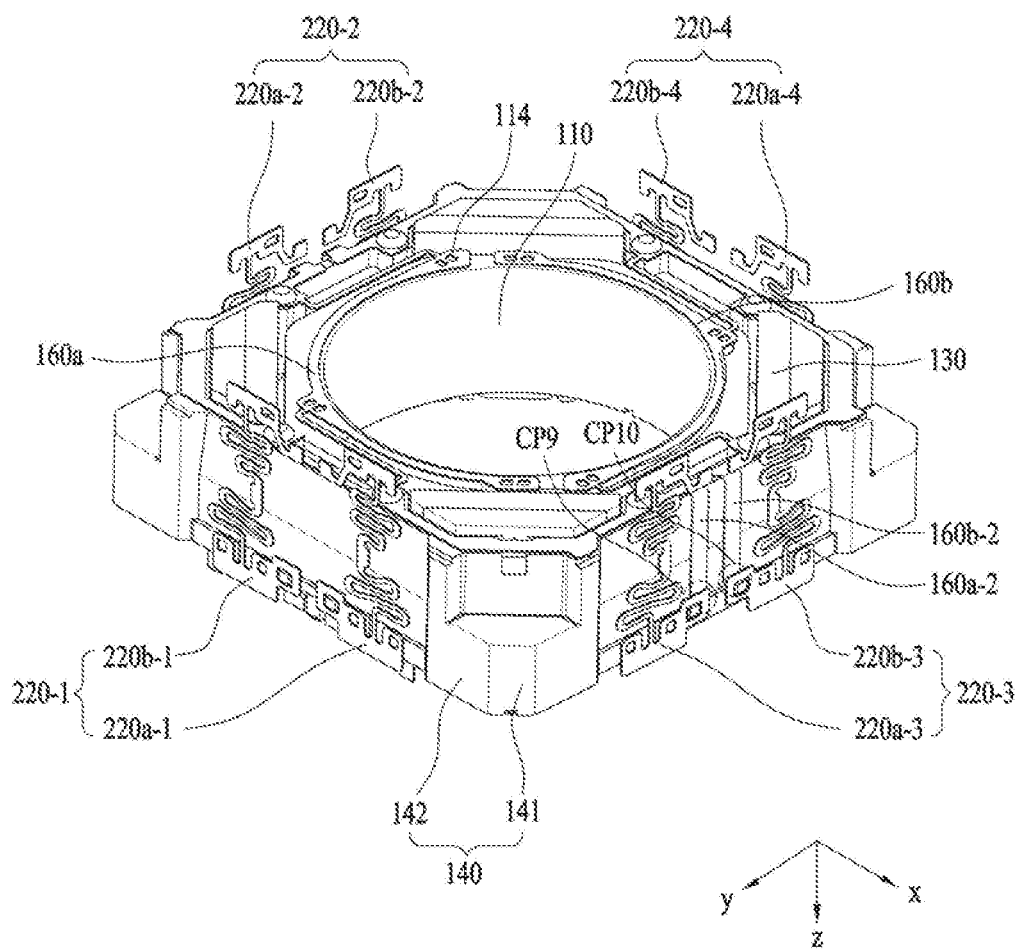
FIG. 8 is a perspective view showing the assembled construction of the bobbin, the first magnet, the housing, a lower elastic member, and elastic support members.

FIG. 8 is a perspective view showing the assembled construction of the bobbin 110, the first magnet 130, the housing 140, the lower elastic member 160, and the elastic support members 220.

The bobbin 110 may be provided at the upper surface thereof with a plurality of upper support protrusions 113, shown in FIGS. 3 and 4, and may be provided at the lower surface thereof with a plurality of lower support protrusions 114, shown in FIG. 8.

The plurality of upper support protrusions 113 may be configured to have a hemispheric shape, as shown in the drawings, or may be configured to have a cylindrical or polygonal column shape. However, the embodiment is not limited thereto.

Figure 9:
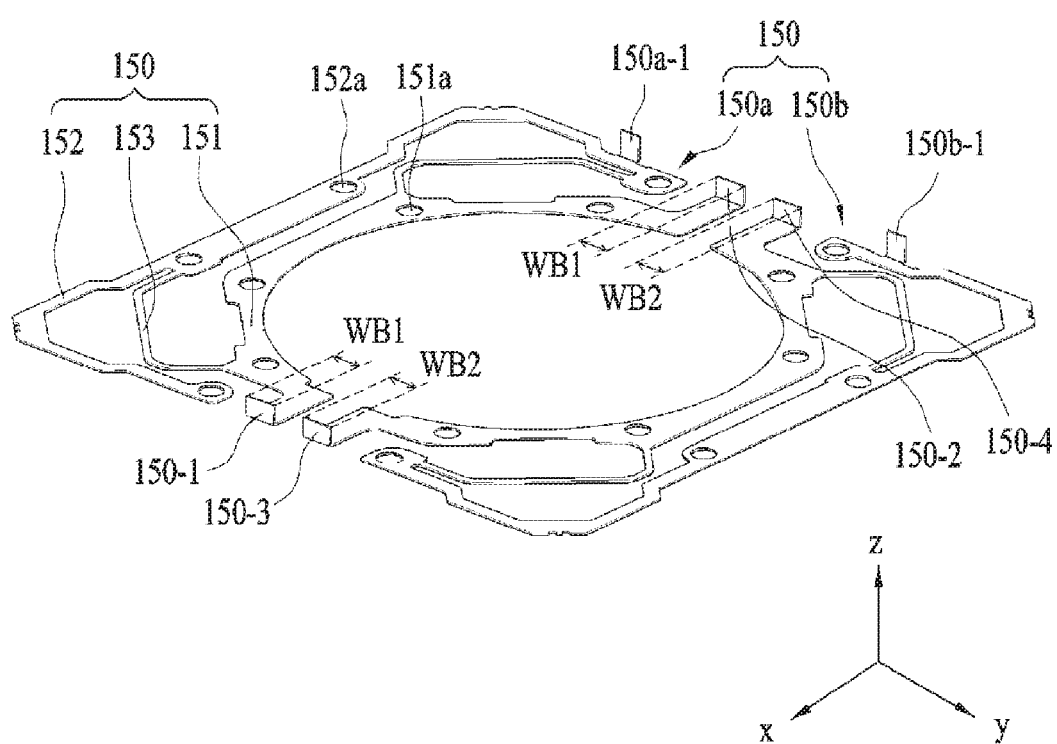
FIG. 9 is a perspective view of an upper elastic member according to the embodiment.

FIG. 9 is a perspective view of the upper elastic member 150 according to the embodiment.

Referring to FIG. 9, the upper elastic member 150 according to the embodiment may include a first upper elastic member 150a and a second upper elastic member 150b, which are separated from each other. The first and second upper elastic members 150a and 150b may be spaced apart from each other, and may be conductively isolated from each other.

Each of the first and second upper elastic members 150a and 150b may include an inner frame 151 to be coupled to the bobbin 110, an outer frame 152 to be coupled to the housing 140, and a frame connector 153 connecting the inner frame 151 and the outer frame 152.

The frame connector 153 may be bent at least one time to define a predetermined pattern. The upward and/or downward movement of the bobbin 110 in the first direction, parallel to the optical axis, may be flexibly supported by change of position and fine deformation of the frame connector 153.

The upper elastic member 150 may be divided into first and second upper elastic members 150a and 150b so as to enable powers of different polarities to be applied thereto.

The first upper elastic member 150a may include a first support member contact 150a-1, and the second upper elastic member 150b may include a second support member contact 150b-1.

The first and second support member contacts 150a-1 and 15041 may project from the outer frame 52. As illustrated in FIG. 9, although the first and second support member contacts 150a-1 and 150b-1 may project in the first direction, which is parallel to the optical axis, the projecting direction is not limited thereto. The first and second support member contacts 150a-1 and 150b-1 may project upward, for example, toward the upper elastic member 150 from the lower elastic member 160.

The first upper elastic member 150a may further include a first damping contact 150-1, formed at one end thereof, and a second damping contact 150-2, formed at the other end thereof.

The first damping contact 150-1 may be formed at one end of the inner frame 151 of the first upper elastic member 150a, and the second damping contact 150-2 may be formed at the other end of the inner frame 151 of the first upper elastic member 150.

The first and second damping contacts 150-1 and 150-2 may project from the upper surface of the inner frame 151 of the first upper elastic member 150a. Specifically, the first and second damping contacts 150-1 and 150-2 may project upward from the upper surface of the inner frame 151 of the first upper elastic member 150a, for example, toward the upper elastic member 150 from the lower elastic member 160.

Specifically, the first damping contact 150-1 may be formed by bending one end of the inner frame 151 of the first elastic member 150a upward, and the second damping contact 150-2 may be formed by bending the other end of the inner frame 151 of the first upper elastic member 150*a* upward. Although the first and second damping contacts 150-1 and 150-2 may be bent in a first direction, for example upward at a right angle, the bending angle is not limited to the right angle.

The second upper elastic member 150*b* may further include a third damping contact 150-3, formed at one end thereof, and a fourth damping contact 150-4, formed at the other end thereof.

The third damping contact 150-3 may be formed at one end of the inner frame 151 of the second upper elastic member 150*b*, and the fourth damping contact 150-4 may be formed at the other end of the inner frame 151 of the second upper elastic member 150*b*.

The third and fourth damping contacts 150-3 and 150-4 may project in the first direction from the upper surface of the inner frame 151 of the second upper elastic member 150*b*. Specifically, the third and fourth damping contacts 150-3 and 150-4 may project upward from the upper surface of the inner frame 151 of the second upper elastic member 150*b*, for example, in the direction toward the upper elastic member 150 from the lower elastic member 160.

Specifically, the third damping contact 150-3 may be formed by bending one end of the inner frame 151 of the second elastic member 150*b* upward, and the fourth damping contact 150-4 may be formed by bending the other end of the inner frame 151 of the second upper elastic member 150*b* upward. Although the third and fourth damping contacts 150-3 and 150-4 may be b upward at right angles, the bending angle is not limited to the right angle.

Referring again to FIGS. 3 and 4, the upper support protrusions 113 of the bobbin 110 may couple and secure the inner frame 151 of the upper elastic member 150 shown in FIG. 9 to the bobbin 110. According to the embodiment, first through holes 151*a* are formed in regions of the inner frame 151 that correspond to the upper support protrusions 113 of the bobbin 110.

The upper support protrusions 113 of the bobbin 110 and the first through holes 151*a* in the upper elastic member 150 may be bonded to each other through thermal fusion, or may be bonded to each other using an adhesive, such as epoxy.

The distances between the upper support protrusions 113 may be appropriately adjusted such that the upper support protrusions 113 do not interfere with peripheral components. Furthermore, the upper support protrusions 113 may be symmetrically disposed at regular intervals with respect to the center of the bobbin 110, or may be symmetrically disposed at irregular intervals with respect to an imaginary line extending through the center of the bobbin 110.

The upper elastic member 150 illustrated in FIG. 9 may be divided into the first and second upper elastic members 150*a* and 150*b* as mentioned above, which are conductively isolated from each other so as to serve as terminals for the application of current to the first coil 120. In order to secure the first and second upper elastic members 150*a* and 150*b*, which are separated from each other, a sufficient number of upper support protrusions 113 may be provided. Accordingly, it is possible to prevent the first and second upper elastic members 150*a* and 150*b* and the bobbin 110 from being incompletely coupled to each other.

Figure 10:
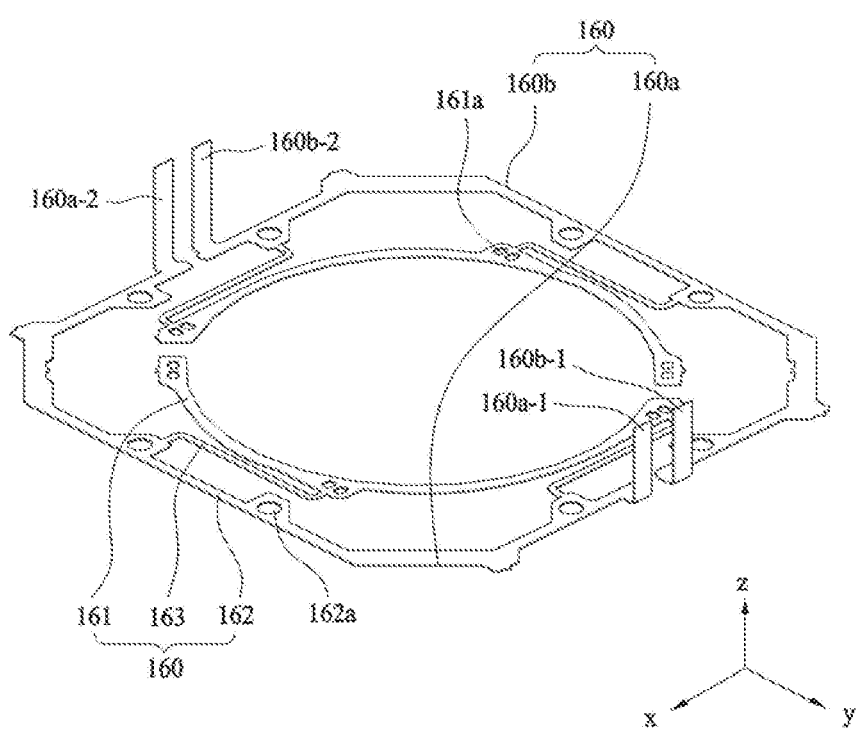
FIG. 10 is a perspective of the lower elastic member according to the embodiment.

FIG. 10 is a perspective view of the lower elastic member 160 according to the embodiment.

Referring to FIG. 10, the lower elastic member 160 may include first and second lower elastic members 160*a* and 160*b*, The first and second lower elastic members 160*a* and 160*b* may be spaced apart from each other, and may be conductively isolated from each other.

Each of the first and second lower elastic members 160*a* and 160*b* may include an inner frame 161 to be coupled to the bobbin 110, an outer frame 162 to be coupled to the housing 140, and a frame connector 163 connecting the inner frame 161 and the outer frame 162.

The frame connector 163 may be bent at least one time to form a pattern having a predetermined shape. The upward and/or downward movement of the bobbin 110 in the first direction parallel to the optical axis may be flexibly supported by change of position and fine deformation of the frame connector 163.

The first lower elastic member 160*a* may include one or more first sensor contacts 160*a*-1 and 160*a*-2. The second lower elastic member 160*b* may include one or more second sensor contacts 160*b*-1 and 160*b*-2.

Although two first sensor contacts 160*a*-1 and 160*a*-2 and two second sensor contacts 160*b*-1 and 160*b*-2 are shown in FIG. 10, the number of sensor contacts is not limited thereto.

The first sensor contacts 160*a*-1 and 160*a*-2 and the second sensor contacts 160*b*-1 and 160*b*-2 may project from the outer frame 162. Although the first sensor contacts 160*a*-1 and 160*a*-2 and the second sensor contacts 160*b*-1 and 160*b*-2 are illustrated in FIG. 10 as projecting in the first direction, the embodiment is not limited to the shape shown in FIG. 10.

Since the lower elastic member 160 is divided into two lower elastic members 160*a* and 160*b* as mentioned above, a sufficient number of lower support protrusions 114 is provided, similar to the number of upper support protrusions 113. Accordingly, it is possible to prevent a lifting phenomenon of the lower elastic member 160, which would otherwise occur when the lower elastic member 160 is divided.

If the lower elastic member 160 is integrally formed rather than being divided, there is no need to provide a number of lower support protrusions 114 equaling the large number of upper support protrusions 113. The reason is because it is possible to reliably couple the lower elastic member 160 to the bobbin 110 even by proving a small number of lower support protrusions 114.

However, when the lower elastic member 160 is divided into the first and second lower elastic members 160*a* and 160*b*, which are not conductively connected to each other, as in the embodiment, a sufficient number of lower support protrusions 114 may be provided so as to hold. the separated first and second lower elastic members 160*a* and 160*b*. Therefore, it is possible to prevent the first and second lower elastic members 160*a* and 160*b* and the bobbin 110 from being incompletely coupled to each other.

Although the lower support protrusions 114 of the bobbin 110 may have a hemispheric shape similar to that of the upper support protrusions 113, they may alternatively have a cylindrical shape or a polygonal column shape. However, the embodiment is not limited to the shape of the lower support protrusions 114 shown in FIG. 5. The lower support protrusions 114 of the bobbin 110 may couple or secure the inner frame 161 of the lower elastic member 160 to the bobbin 110.

In place of the first and second upper elastic members 150*a* and 150*b*, the first and second lower elastic members 160*a* and 160*b*, which are insulated and separated from each other, may serve as terminals for the application of current to the first coil 120.

The reason why the lower elastic member 160 is divided as described above will be described in detail at the time of explanation of the elastic support member 220.

Second through holes 161*a* may be formed in the regions of the inner frame 161 of the first and second lo elastic members 160a and 160b that correspond to the lower support protrusions 114 of the bobbin 110. The lower support protrusions 114 of the bobbin 110 and the second through holes 161a may be bonded to each other through thermal fusion, or may be bonded to each other by means of an adhesive, such as epoxy.

The distances between the lower support protrusions 114 may be appropriately adjusted such that the lower support protrusions 114 do not interfere with peripheral components. Specifically, the lower support protrusions 114 may be symmetrically disposed at regular intervals with respect to the center of the bobbin 110.

Although the upper elastic member 150 and the lower elastic member 160 may be embodied as leaf springs, the embodiment is not limited as to the kind of material of the upper and lower elastic members 150 and 160.

Referring to FIGS. 4 and 5, the winding protrusions 112 of the bobbin 110 may project from the upper and outer circumferential surface of the bobbin 110. Each of the two winding protrusions 112 of the bobbin 110 may be wound with one of the starting line and the ending line, which are both ends of the first coil 120. The ends of the first coil 120 may be conductively connected to the upper surface of the upper elastic member 150 on the upper surface of the bobbin 110 closed to the winding protrusions 112 by means of a conductive connection member, such as a solder.

Two winding protrusions 112 of the bobbin 110 may be disposed on the lateral side surface of the bobbin 110 so as to be close to each other, as illustrated in FIG. 4, or may be disposed at positions on lateral side surfaces opposite each other with respect to the center of the bobbin 110, respectively, unlike the configuration shown in FIG. 4.

Each of the winding protrusions 112 may be provided at the end thereof with a stop protrusion 112a-1 so as to prevent the wound first coil 120 from being separated therefrom, or to guide the position of the first coil 120. For example, the stop protrusion 112a-1 may be configured such that a width of the winding protrusion 112 projecting from the outer circumferential surface of the bobbin 110 continuously increases outward. The end of the stop protrusion 112a-1 may be provided with a stepped portion.

The bobbin 110, the housing 140, and the upper and lower elastic members 150 and 160 may be assembled through a bonding procedure using thermal fusion and/or an adhesive or the like. At this point, the bonding procedure may be completed through adhesive bonding after thermal fusion, depending on the assembly sequence.

For example, when the bobbin 110 is first assembled with the inner frame 161 of the lower elastic member 160 and then the housing 140 is secondly assembled with the outer frame 162 of the lower elastic member 160, the lower support protrusions 114 of the bobbin 110 and the second through holes 161a may be bonded to each other through thermal fusion, and the lower frame support protrusions 145 of the housing 140 and the third through holes 162a may be bonded to each other through thermal fusion. Subsequently, when the bobbin 110 is thirdly assembled with the inner frame 151 of the upper elastic member 150, the upper support protrusions 113 of the bobbin and the first through holes 151a may be bonded to each other through thermal fusion. When the housing 140 is finally secured to the outer frame 152 of the upper elastic member 150, the upper frame support protrusions 144 of the housing 140 and the fourth through holes 152a may be bonded to each other through the application of an adhesive, such as epoxy. However, this assembly sequence may be changed. In other words, the first to third assembly procedures may be executed through thermal fusion, and the final securing procedure may be executed through bonding. Since the thermal fusion procedure may cause deformation, such as distortion, the bonding in the final securing procedure may compensate for the deformation.

The first coil 120 may be wound around the outer circumferential surface of the bobbin 110 by a worker or a machine, and then the starting line and the ending line of the coil 120 may be wound around respective winding protrusions 112 and secured thereto. At this point, the positions of the ends of the first coil 120 that are wound around the winding protrusions 112 may vary depending on the worker.

Although the first coil 120 may be configured to have a ring shape or a polygonal hollow block shape which is fitted over the outer circumferential surface of the bobbin 110, the embodiment is not limited thereto, and the first coil 120 may be directly wound around the outer circumferential surface of the bobbin 110. In any case, the starting line and the ending line of the first coil 120 may be wound around winding protrusions 112 and secured thereto, and the other components are the same.

The first coil 120 may be configured to have an approximately octagonal shape, as illustrated in FIG. 2. The first coil 120 may have a shape corresponding to that of the outer circumferential surface of the bobbin 110, and the bobbin 110 may also have an octagonal shape. At least four of the outer surfaces of the first coil 120 may be flat, and corner portions connecting the at least four surfaces may also be flat. However, the embodiment is not limited thereto, and the corners portions may be rounded.

The linear or flat portions of the first coil 120 may be configured to correspond to the first magnet 130. One surface of the first magnet 130, which corresponds to or faces the first coil 120, may have the same radius of curvature as that of the first coil 120. In other words, when the first coil 120 is configured to be linear or flat, the corresponding first magnet 130 may have a linear or flat surface. When the first coil 120 is configured to be rounded or curved, the corresponding first magnet 130 may have a rounded or curved surface. Meanwhile, although the first coil 120 is configured to be rounded or curved, the corresponding first magnet 130 may have a linear or flat surface, and vice versa.

The first coil 120 serves to fulfill the autofocus function by moving the bobbin 110 in the direction parallel to the optical axis. When current is supplied to the first coil 120, the first coil 120 may create electromagnetic force by interaction with the first magnet 130, and the created electromagnetic force may move the bobbin 110.

The first coil 120 may be configured to correspond to the first magnet 130. When the first magnet 130 is constituted by a single body and the entire surface thereof, facing the first coil 120, has the same polarity, the surface of the first coil 120 corresponding to the first magnet 130 may also be configured to have the same polarity, that is, to allow current to flow in the same direction.

When the first magnet 130 is divided into two or four segments by a plane perpendicular to the optical axis so that the surface thereof, facing the first coil 120, is thus divided into two or four sections, the first coil 120 may also be divided into a number corresponding to the number of first magnet segments.

The first magnet 130 may be disposed at a position corresponding to the first coil 120.

Although the first magnet 130 may be disposed at the corner portion of the housing 140 as shown in FIG. 8, the embodiment is not limited thereto.

Although the first magnet 130 may be configured to have an approximately trapezoidal shape, which corresponds to the shape of the corner portion, the embodiment is not limited thereto.

The surface of the first magnet 130 that faces the first coil 120 may have the same radius of curvature as that of the corresponding surface of the first coil 120.

The first magnet 130 may be constituted by a single body. In this embodiment, the first magnet 130 may be disposed such that a first surface of the first magnet 130 facing the first coil 120 may be set to be an N pole 134, and a second surface, opposite to the first surface, may be set to be an S pole 132. However, the embodiment is not limited thereto, and the reverse configuration is also possible.

The first magnet 130 may include at least two magnets. In this embodiment, four magnets may be provided. At this point, the first magnet 130 may be configured to have an approximately trapezoidal shape when viewed in a plan view, as shown in FIG. 5, or may be configured to have a triangular shape.

Although the first surface of the first magnet 120, facing the first coil 120, may be configured to be linear or flat, the embodiment is not limited thereto. In another embodiment, when the surface of the first coil 120 corresponding to the first magnet 120 is configured to be rounded or curved, the first surface of the first magnet 130, corresponding to the surface of the first coil 120, may also be configured to have a rounded or curved surface having a radius or curvature corresponding to that of the surface of the first coil 120. Consequently, it is possible to maintain a constant distance between the first magnet 130 and the first coil 120. In this embodiment, the first magnet 130 may be provided at each of four corner portions of the housing 140.

In another embodiment, only one of the first magnet 130 and the first coil 120 may be configured to have a flat surface, and the other may be configured to have a curved surface. Furthermore, the two facing surfaces of the first coil 120 and the first magnet 130 may be configured to be curved surfaces. In this case, the two facing surfaces of the first coil 120 and the first magnet 130 may have the same radius of curvature.

As shown in FIG. 5, when the first magnet 130 has a trapezoidal shape when viewed in a plan view, among the four first magnets 130, a pair of first magnets 130 may be disposed parallel to each other in a second direction, and the other pair of first magnets 130 may be disposed parallel to each other in a third direction. Thanks to this arrangement, it is possible to control the movement of the housing 140 for optical image stabilization, which will be described later.

The housing 140 may support the first magnet 130, and may accommodate the bobbin 110 in a hollow space thereof so as to allow the bobbin 110 to move in the first direction parallel to the optical axis. The housing 140 may be configured to have a hollow column shape. Specifically, the housing 140 may have a polygonal (e.g. rectangular or octagonal) hollow space or a cylindrical hollow space.

The housing 140 may be configured to have a polygonal shape when viewed in a plan view, According to this embodiment, the housing 140 may have an octagonal shape as shown in FIGS. 6 and 7.

The housing 140 may have a plurality of lateral side surfaces. For example, when the housing 140 is configured to have an octagonal shape when viewed in a plan view, the housing 140 may have eight lateral side surfaces. The eight lateral side surfaces of the housing 140 may be classified into first surfaces 141 and second surfaces 142.

The first surfaces 141 of the housing 140 may have surfaces on which the first magnets 130 are mounted, and the second surfaces 142 of the housing 140 may have surfaces on which the elastic support members 220 are mounted. The second surfaces 142 of the housing 140 may connect the first surfaces 141 to each other, and may be flat surfaces recessed by a predetermined depth.

The first surfaces 141 of the housing 140 may be disposed at the corner portions of the housing 140. According to this embodiment, each of the first surfaces 141 may have a surface area equal to or larger than the surface area of the first magnet 130.

Referring to FIG. 7, the first magnet 130 may be secured to a magnet mounting recess 141a formed in the first surface 141 of the housing 140.

The magnet mounting recess 141a may be configured to have a concave recess of a size corresponding to that of the first magnet 130, and at least three surfaces, for example, both side surfaces and an upper surface of the first magnet 130, may face inner surfaces of the recess.

The bottom surface of the magnet mounting recess 141a, which faces a second coil 230 (described later), may be provided with an opening such that the bottom surface of the first magnet 130 directly faces the second coil 230.

The first magnet 130 may be secured to the magnet mounting recess 141a of the housing 140 by means of an adhesive or the like. However, the embodiment is not limited thereto, and an adhesive member such as double-sided adhesive tape may be used. The magnet mounting recess 141a of the housing 140 may be embodied as a magnet mount hole through which a portion of the magnet 130 is fitted or exposed, in place of the concave recess shown in FIG. 7.

The second surface 142 of the housing 140 may be disposed to be parallel to the side surface of the cover member 300. Furthermore, the second surface 142 of the housing 140 may be configured to have a surface area larger than that of the first surface 141 of the housing 140.

As illustrated in FIGS. 6 and 7, the second surface 142 of the housing 140 may be provided with a mounting recess 142a having a predetermined depth. The mounting recess 142a of the housing 140 will be described in detail at the time of explanation of the elastic support member 220.

The housing 143 may include at least one second stopper 143 projecting from the upper surface thereof so as to prevent collisions with the cover member 300. Specifically, the second stopper 143 of the housing 140 may prevent the upper surface of the housing 140 from directly colliding with the inner surface of the cover member 300 at the time of generation of an external shock.

For example, the second stopper 143 of the housing 140 may include a plurality of second stoppers, which are disposed spaced apart from each other. At least a pair of second stoppers 143 of the plurality of second stoppers 143 may be disposed to face each other.

The housing 140 may include four second stoppers 143, which are spaced apart from one another. The second stoppers 143 may be arranged to coincide with the first stoppers 111 of the bobbin 110.

The second stopper 143 of the housing 140 may be provided with a first mounting recess 1464, in which the first stopper 111 of the bobbin 110 is fitted or mounted. The shape of the first mounting recess 146-1 may coincide with that of the first stopper 111 of the bobbin 110.

The second stopper 143 of the housing 140 serves to guide the installation position of the upper elastic member 150.

The upper elastic member 150 may include a plurality of divided upper elastic members, for example, 150a and 150b.

Referring to FIGS. 3, 9 and 17, the housing 140 may include guide protrusions 148: 148a and 148b, which project from the upper surface of the housing 140 such that they are disposed between the divided upper elastic members 150a and 150b.

The guide protrusions 148 may be provided in a number corresponding to the number of divided upper elastic member 150. For example, when the upper elastic member 150 is divided into two upper elastic members, as shown in FIG. 9, the housing 140 may include two guide protrusions 148a and 148b, which are spaced apart from each other. Although the two guide protrusions 148a and 148b may be disposed to face each other, the embodiment is not limited thereto. The two guide protrusions 148a and 148b may be disposed between one ends of the first and second upper elastic members 150a and 150b and between the other ends of the first and second upper elastic members 150a and 150b, respectively, depending on the structure in which the upper elastic member 150 is divided.

The housing 140 may include n guide protrusions (where n is a natural number satisfying N>1), first guide grooves formed in first sides of the n guide protrusions, and second guide grooves formed in second sides of the n guide protrusions.

One end and the other end of each of the plurality of upper elastic members may be disposed in the first and second guide grooves formed in respective sides of each of the n guide protrusions.

For example, the housing 140 may include the first and second guide protrusions 148a and 148b projecting from the upper surface thereof, a first guide groove 149a formed in the upper surface thereof positioned at one side of the first guide protrusion 148a, a second guide groove 149b formed in the upper surface thereof positioned at the other side of the first guide protrusion 148a, a third guide groove 149c formed in the upper surface thereof positioned at one side of the second guide protrusion 148b, and a fourth guide groove 148d formed in the upper surface thereof positioned at the other side of the second guide protrusion 148d.

The damping member DA may be disposed between the divided upper elastic members 150a and 150b and the first and second guide protrusions 148 so as to absorb or attenuate vibrations, in the direction parallel to the optical axis, of the bobbin 110. Specifically, the damping members DA may prevent oscillation of the bobbin 110 when the bobbin 110 moves in the direction parallel to the optical axis. The damping members DA may be made of a material capable of absorbing vibrations, for example, silicone.

The first guide protrusion 148a may be disposed between the one end of the first upper elastic member 150a and the one end of the second upper elastic member 150b, which are disposed on the upper surface of the housing 140, and the second guide protrusion 148b may be disposed between the other end of the first upper elastic member 150a and the other end of the second upper elastic member 150b. The first and second guide protrusions 148a and 148b serve to separate the first and second upper elastic members 150a and 150b from each other for conductive insulation therebetween.

The first guide protrusion 148a may be disposed between the first damping contact 150-1 of the first upper elastic member 150a and the third damping contact 150-3 of the second upper elastic member 150b, which are placed on the upper surface of the housing 140.

The second guide protrusion 148b may be disposed between the second damping contact 150-2 of the first upper elastic member 150a and the fourth damping contact 150-4 of the second upper elastic member 150b, which are placed on the upper surface of the housing 140.

In other words, the first guide protrusion 148a may be disposed between the one end 150-1 of the inner frame 151 of the first upper elastic member 150a and the one end 150-3 of the inner frame 151 of the second upper elastic member 150b. That is, the first guide protrusion 148a may be disposed between the first damping contact 150-1 of the first upper elastic member 150a and the third damping contact 150-3 of the second upper elastic member 150b.

Furthermore, the second guide protrusion 148b may be disposed between the other end 150-2 of the inner frame 151 of the first upper elastic member 150a and the other end 150-4 of the inner frame 151 of the second upper elastic member 150b. That is, the second guide protrusion 148a may be disposed between the second damping contact 150-2 of the first upper elastic member 150a and the fourth damping contact 150-4 of the second upper elastic member 150b.

The first to fourth guide grooves 149a to 149d may be configured to be recessed from the upper surface of the housing 140 and to open inward into the housing 140. In addition, the first to fourth guide grooves 149a to 149d may be configured to open outward from the housing 140.

The first and second guide grooves 149a and 149b may be symmetrically positioned with respect to the first guide protrusion 148a, and the third and fourth guide grooves 149c and 149d may be symmetrically positioned with respect to the second guide protrusion 148b. However, the embodiment is not limited thereto, and the first and second guide grooves 149a and 149b may have the same shape, depth, longitudinal length and transverse length.

The first and second guide grooves 149a and 149b may be connected to side surfaces of the first guide protrusion 148a, and the third and fourth guide grooves 149c and 149d may be connected to side surfaces of the second guide protrusion 148b.

Specifically, the first guide groove 149a may be connected to the first side surface of the first guide protrusion 148a, and the second guide groove 149b may be connected to the second side surface of the first guide protrusion 148a. At this point, the first side surface and the second side surface of the first guide protrusion 148a may be opposite to each other.

Furthermore, the third guide groove 149c may be connected to a first side surface of the second guide protrusion 148b, and the fourth guide groove 149d may be connected to a second side surface of the second guide protrusion 148b. At this point, the first side surface and the second side surface of the second guide protrusion 148b may be opposite to each other.

The lower surface of the first guide protrusion 148a may be flush with the bottom surfaces of the first and second guide grooves 149a and 149b, and the lower surface of the second guide protrusion 148b may be flush with the bottom surfaces of the third and fourth guide grooves 149c and 149d.

For example, a groove may be formed in the upper surface of the housing 140, and the first guide protrusion 148a may project from the center of the bottom surface of the groove. Consequently, by providing the first guide protrusion 148a, the first guide groove 149a may be formed in one side of the first guide protrusion 148a, and the second guide groove 149b may be formed in the other side of the first guide protrusion 148a, The third and fourth guide grooves 149c and 149d may also be configured in the same way as described above.

The upper surfaces of the first and second guide protrusions 148a and 148b may be positioned above the upper surface of the housing 140 such that the height H1 between the upper surface of the housing 140 and the upper surfaces of the first and second guide protrusions 148a and 148b satisfies H1>0 (see FIG. 17), Determination of the height H1 is intended to reliably guide the one ends 150-1 and 150-3 and the other ends 150-2 and 150-4 of the first and second upper elastic members 150a and 150b.

The one end of the first upper elastic member 150a may be disposed in the first guide groove 149a, and may be spaced apart from the bottom surface of the first guide groove 149a. However, the embodiment is not limited thereto, and the one end of the first upper elastic member 150a may contact the bottom surface of the first guide groove 149a in another embodiment.

The one end of the second upper elastic member 150b may be disposed in the second guide groove 149b, and may be spaced apart from the bottom surface of the second guide groove 149b. However, the embodiment is not limited thereto, and the one end of the second upper elastic member 150b may contact the bottom surface of the second guide groove 149b in another embodiment.

The other end of the first upper elastic member 150a may be disposed in the third guide groove 149c, and may be spaced apart from the bottom surface of the third guide groove 149c. However, the embodiment is not limited thereto, and the other end of the first upper elastic member 150a may contact the bottom surface of the third guide groove 149c in another embodiment.

The other end of the second upper elastic member 150b may be disposed in the fourth guide groove 149d, and may be spaced apart from the bottom surface of the fourth guide groove 149d. However, the embodiment is not limited thereto, and the other end of the second upper elastic member 150b may contact the bottom surface of the fourth guide groove 149d in another embodiment.

In other words, each of the first to fourth damping contacts 150-1 to 150-4 may be disposed in the corresponding one of the first to fourth guide grooves 149a to 149d, and may be spaced apart from the bottom surface of the corresponding guide groove.

The width WG1 of the first guide groove 149a may be greater than the width WB1 of the one end or the other end of the first upper elastic member 150a, and the width WG2 of the second guide groove 149b may be wider than the width WB2 of the one end or the other end of the second upper elastic member 150b. Although the width of the first guide groove 149a and the width of the second guide groove 149b may be the same, the embodiment is not limited thereto.

The width of the third and fourth guide grooves 149c and 149d may also be the same as the width of the first and second guide grooves 149a and 149b.

The damping members DA (DA1 to DA4) may be disposed between side surfaces 148-1 and 148-2 of the guide protrusion 148 and the one end or the other end of the first and second upper elastic members. Furthermore, the damping members DA (DA1 to DA4) may contact side surfaces 148-1 and 148-2 of the guide protrusion 148 and the one end or the other end of the first and second upper elastic members.

The damping members DA (DA1 to DA4) may be disposed between the side surfaces 1484 and 148-2 and the first to fourth damping contacts 1504 to 150-4. Furthermore, the damping members DA (DA1 to DA4) may contact the side surfaces 1484 and 148-2 and the first to fourth damping contacts 150-1 to 150-4.

The first damping member DA1 may be disposed between the first side surface 148a-1 of the first guide protrusion 148a and the first damping contact 150-1 of the first upper elastic member 150a, and the second damping member DA2 may be disposed between the second side surface 148a-2 of the first guide protrusion 148a and the third damping contact 150-3 of the second upper elastic member 150b. The first side surface 148a-1 of the first guide protrusion 148a may be the side surface opposite to the second side surface 148a-2 of the first guide protrusion 148a.

The third damping member DA3 may be disposed between the first side surface 148b-1 of the second guide protrusion 148b and the second damping contact 150-2 of the first upper elastic member 150a, and the fourth damping member DA4 may be disposed between the second side surface 148b-2 of the second guide protrusion 148b and the fourth damping contact 150-4 of the second upper elastic member 150b. The first side surface 148b-1 of the second guide protrusion 148b may be the side surface opposite to the second side surface 148b-2 of the second guide protrusion 148b.

Since the damping members DA are disposed between the side surfaces 148-1 and 148-2 of the guide protrusions 148, which are parallel to the moving direction of the bobbin 110, and the damping contacts 150-1 to 150-4, it is possible to easily control the absorption and attenuation of vibrations in the moving direction of the bobbin 110.

Thanks to the formation of the damping contacts 150-1 to 150-4 by bending one ends and the other ends of the first and second upper elastic members 150a and 150b, the embodiment may increase the contact area of the damping members DA disposed between the damping contacts 150-1 to 150-4 and the side surfaces 148a-1, 148a-2, 148b-1 and 148b-2 of the guide protrusions 148.

With the increase in contact area between the damping contacts 150-1 to 150-4 and the damping members DA, it is possible to increase the controllable contact area of the damping members DA disposed between the upper elastic member 150 and the housing 140, thus ensuring an accurate autofocusing operation.

If a damping member is applied between one ends of the first and second upper elastic members 150a and 150b and the upper surface of the housing 140 in order to absorb or attenuate vibrations in the direction parallel to the optical axis of the bobbin 110, it may be difficult to control the action of absorbing or attenuating vibrations in the moving direction of the bobbin 110. In this case, since the damping member contacts the upper surface of the housing, which is perpendicular to the moving direction of the bobbin 110, it is impossible for the damping member to ensure a sufficient area to easily control the absorption of vibrations of the bobbin 110. Hence, hysteresis characteristics of the bobbin 110 may be deteriorated, and it may be impossible to execute an accurate autofocusing operation.

Furthermore, if a damping member is applied between one ends of the first and second upper elastic members 150a and 150b and the upper surface of the housing 140, it may not be easy to apply the damping material, and it may be difficult to cure the damping material using ultraviolet rays.

Generally, an operation of applying a damping material may be performed after assembling all components except for the cover member 300 and then clamping all the components using a jig or the like. In order to apply a damping material to the upper surface of the housing 140, the jig has to release the assembled components. At this time, the assembled components may be break. This is because it is not easy to apply the damping material to the upper surface of the housing 140 because the jig is positioned above the assembled components.

Furthermore, it is difficult to cure the damping material because the radiation of ultraviolet rays to the applied damping material is interrupted by the jig.

According to the embodiment, since the damping member DA is applied between the one ends 150-1 and 150-3 of the first and second upper elastic members 150a and 150b, which are bent upward, and the guide protrusions 148, it is possible to apply the damping material and to easily radiate ultraviolet rays to the damping members DA even though the assembled components are clamped by the jig.

In another embodiment, damping members may also be additionally disposed between the one ends and the other ends of the first and second upper elastic members 150a and 150b and the bottom surfaces of the first to fourth guide grooves 149a to 149d.

The housing 140 may be provided at the upper surface thereof with the plurality of upper frame support protrusions 144. The upper frame support protrusions 144 may be provided in a larger number than the number of upper support protrusions 113. This is because the length of the outer frame 152 is greater than that of the inner frame 151.

The outer frame 152 of the upper elastic member 150 may be provided at positions corresponding to the upper frame support protrusions 144 with the fourth through holes 152a, having a shape corresponding to that of the upper frame support protrusions 144. The upper frame support protrusions 144 may be secured to the fourth through holes 152a through the use of an adhesive or thermal fusion.

As shown in FIG. 7, the housing 140 may be provided at the lower surface thereof with the plurality of lower frame support protrusions 145 to hick the outer frame 162 of the lower elastic member 160 is coupled. The lower frame support protrusions 145 may be provided in a greater number than the number of lower support protrusions 114. This is because the length of the outer frame 162 of the lower elastic member 160 is greater than that of the inner frame 161.

The outer frame 162 of the lower elastic member 160, shown in FIG. 10, may be provided at positions corresponding to the lower frame support protrusions 145 with the third through holes 162a, having a shape corresponding to that of the lower frame support protrusions 145 of the housing 140. The third through holes 162a and the lower frame support protrusions 145 may be secured to each other through the use of an adhesive or thermal fusion.

Although not shown in the drawings, the housing 140 may further be provided at the lower surface thereof with fourth stoppers. The fourth stoppers may project from the lower surface of the housing 140. The fourth stoppers may serve to prevent the lower surface of the housing 140 from colliding with the base 210 and/or the circuit board 250, which will be described later.

In addition, the fourth stoppers may be maintained in the state of being spaced apart from the base 210 and/or the circuit board 250 by a predetermined distance when the bobbin 110 is in the initial position and is operated normally. Accordingly, the housing 140 is spaced apart from the base 210 from below, and is spaced apart from the cover member 300 from above, and thus the housing 140 may be supported by the elastic support member 220 without interference from upper and lower parts. Consequently, the housing 140 may be shifted in the second and third directions in the plane perpendicular to the optical axis. This shifting operation will be described later.

The first lens moving unit 100 according to the embodiment may perform an operation of detecting the position of the bobbin 110 in the z axis direction, which is the direction of the optical axis, and feeding the detected position back to the outside through the circuit board 250 so as to accurately control the movement of the bobbin 110. To this end, the first lens moving unit 100 may further include the first position sensor 170 and the second magnet 180.

The first position sensor 170 may be supported by the housing 140. To this end, the housing 140 may be provided at a lateral side surface thereof with a first position sensor mounting recess 172. The first position sensor 170 is disposed in the first position sensor mounting recess 172 to detect the distance by which the bobbin 110 moves in the first direction. The first position sensor 170 may include a plurality of pins for receiving driving power and sending output obtained from the results of the detection to the outside.

The first position sensor mounting recess 172 may be provided at one surface thereof with an inclined surface (not shown). This is intended to make it easy to inject epoxy for assembling the first position sensor 170. Although the first position sensor 170 may be secured in the first position sensor mounting recess 172 by means of epoxy or the like, the embodiment is not limited thereto. In another embodiment, the first position sensor mounting recess 172 may not be provided with additional epoxy or the like.

Referring to FIGS. 5 and 6, the first position sensor mounting recess 172 and the second magnet 180 may be positioned on the same line. Accordingly, the center of the second magnet 180 and the center of the first position sensor 170 may be arranged in the horizontal plane perpendicular to the optical axis.

For example, the first position sensor 170 may be fitted in the first position sensor mounting recess 172 of the housing 140 and supported thereby, as illustrated in FIG. 6, or may be attached to the housing 140 and supported thereby using an adhesive member, such as epoxy or a double-sided adhesive member, unlike the former case.

Although the first position sensor 170 may be a Hall sensor, the embodiment is not limited thereto. Any sensor may be used, as long as it can detect variation of magnetic force.

Referring to FIGS. 4 and 5, the second magnet 180 may be attached to the outer circumferential surface of the bobbin 110 such that it faces the first position sensor 170. According to the embodiment, the second magnet 180 may be disposed between the plurality of first magnets 130, which are spaced apart from each other along the outer circumferential surface of the bobbin 110. For example, the second magnet 180 may be disposed in the space defined between two adjacent first magnets 130. Specifically, the center of the second magnet 180 may be positioned in the center of the space between the two adjacent first magnets 130.

This arrangement is intended to minimize interference between the first magnets 130 and the second magnet 180. Although the second magnet 180 may be disposed on the outer circumferential surface of the bobbin 110 above the first coil 120, the embodiment is not limited thereto. This is intended to prevent false autofocusing due to interference between the second magnet 180 and the first coil 120.

The interaction between the first magnet 130 and the first coil 120 may be interrupted by the second magnet 180. This is because a magnetic field may be generated by the second magnet 180. Accordingly, according to this embodiment, the first lens moving unit 100 may further include the magnetic field compensation metal member 182 in order to minimize interruption of the interaction between the first magnet 130 and the first coil 120 by the magnetic field generated from the second magnet 180.

Referring to FIGS. 5 and 11, the magnetic field compensation metal member 182 may be disposed at a position on the outer circumferential surface that is symmetrical with respect to the second magnet 180. Specifically, interruption of the interaction may be minimized only when the magnetic field compensation metal member 182 and the second magnet 180 are positioned on the same line HL in the y axis direction, which is the third direction. At this point, the same line HL may extend through the center of the bobbin 110. For example, the magnetic field compensation metal member 182 and the second magnet 180 may be arranged such that they are positioned diametrically opposite to each other in the direction perpendicular to the optical axis.

According to this embodiment, the magnetic field compensation metal member 182 may be made of a metal material. The magnetic field compensation metal member 182 may be made of a material having magnetic properties, for example, a magnetic material or a magnet.

In some cases, the first lens moving unit 100 may not include e first position sensor 170, the second magnet 180, and the magnetic field compensation metal member 182. The first lens moving unit 100 may further include various devices for improving the autofocusing function of the first lens moving unit 100, in addition to the first position sensor 170. In this case, the position of the device or the method or process of receiving power through the circuit board 250 and supplying necessary signals to the circuit board 250 may be identical to those of the first position sensor 170.

Referring again to FIG. 2, the second lens moving unit 200, which serves as an optical image stabilizing lens moving unit, may include the first lens moving unit 100, the base 210, the elastic support member 230, the second position sensor 240, and the circuit board 250.

Although the first lens moving unit 100 may include the above-mentioned components, it may be replaced with another optical system capable of fulfilling the autofocusing function in place of the above-mentioned components. Specifically, the first lens moving unit 100 may be constituted by an optical module using a single lens moving actuator or a refractive index variable actuator, in place of using an autofocusing actuator employing a voice moving actuator. In other words, the first lens moving unit 100 may adopt any optical actuator as long as it is capable of fulfilling an autofocusing function. However, there is a need to install the first magnet 130 at a position corresponding to the second coil 230, which will be described later.

Figure 12:
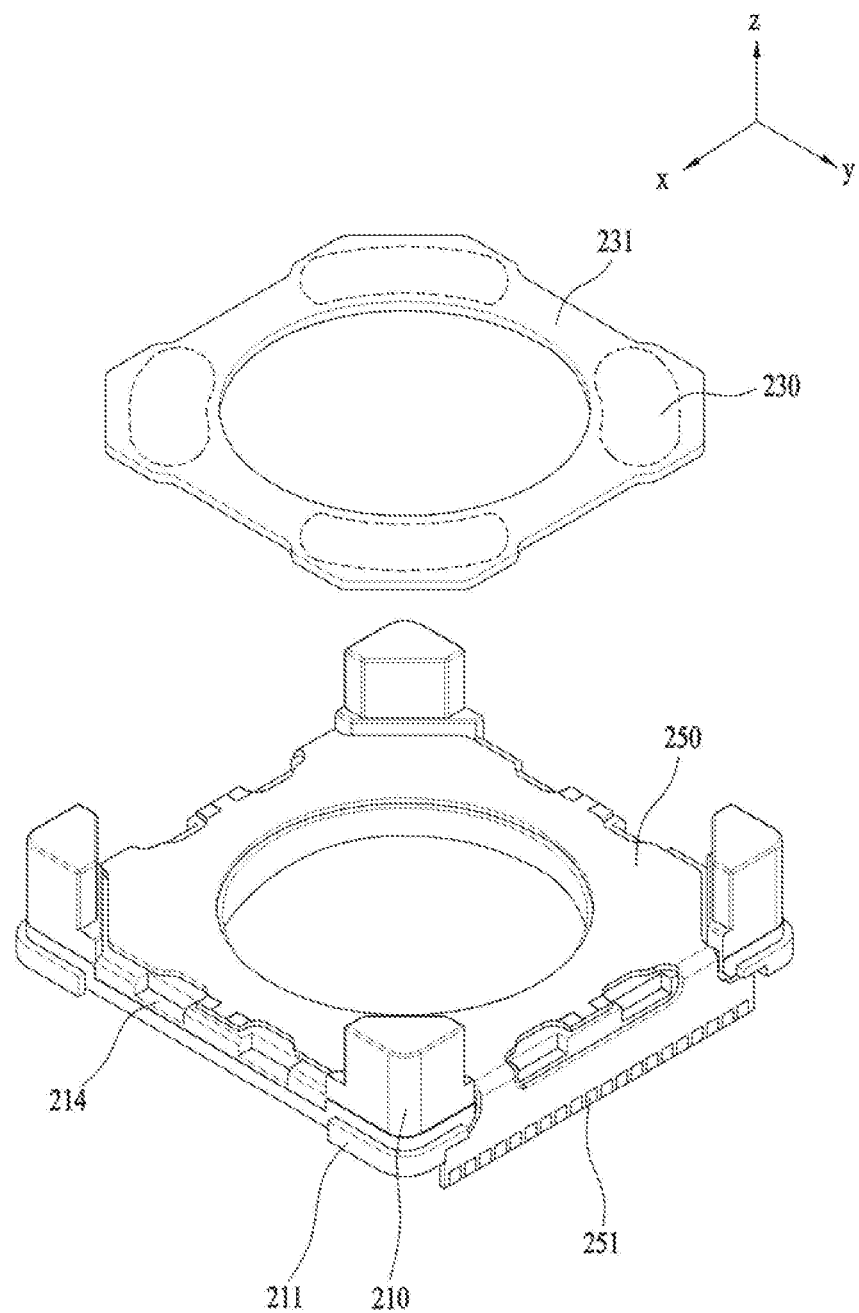
FIG. 12 is a partially assembled perspective view of a second coil, a circuit board, and a base.
Figure 13:
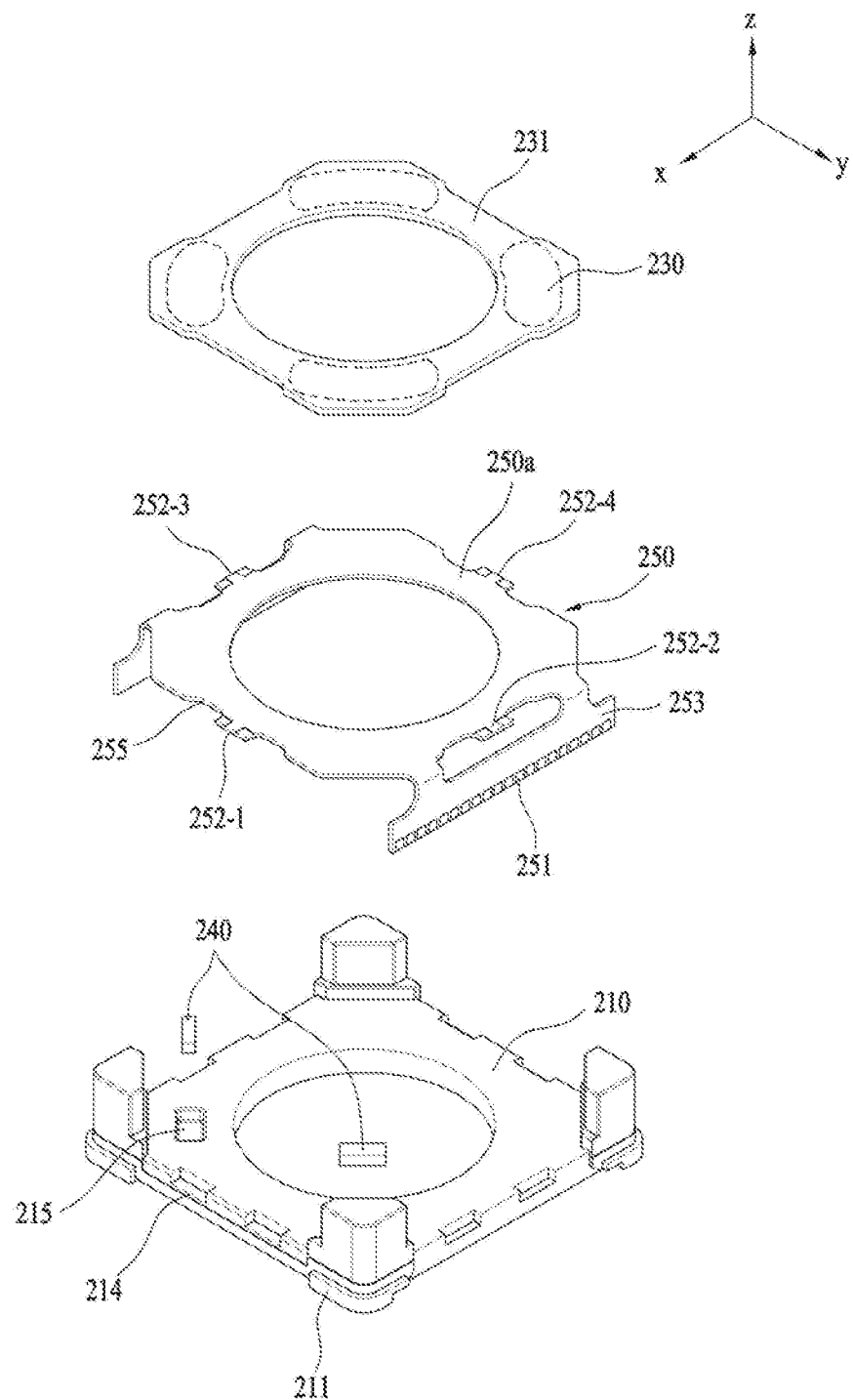
FIG. 13 is an exploded perspective view of the second coil, the circuit board, and the base.

FIG. 12 is a partially assembled w of the second coil 230, the circuit board 250, and the base 210. FIG. 13 is an exploded perspective view of the second coil 230, the circuit board 250, and the base 210.

As shown in FIG. 2, the base 210 of the second lens moving unit 200 may have an approximately rectangular shape when viewed in a plan view. The base 210 may be provided with the elastic support member 220 secured to one surface thereof. The base 210 may be provided with stepped portions 211, to which an adhesive is applied when adhesively securing the cover member 300, as illustrated in FIGS. 12 and 13. The upper surfaces of the stepped portions 211 may contact the end of the cover member 300 in a surface contact manner.

The base 210 may be disposed spaced apart from the first lens moving unit 100 by a predetermined distance. The base 210 may include a support recess having a size corresponding to a terminal plate 253 of the circuit board 250, which has terminals 251. The support recess is formed in a surface of the base 210 corresponding to the terminal plate 253 of the circuit board 250. The support recess is formed inward from the outer surface of the base 210 by a predetermined depth such that the terminal plate 253 of the circuit board 250 does not project, or controllably projects from the outer surface of the base 210.

The stepped portions 211 may serve to guide the cover member 300 coupled thereto, and may contact the end of the cover member 300 in a surface contact manner. The stepped portions 211 and the end of the cover member 300 may be adhesively secured to each other, or sealed by means of an adhesive or the like.

The base 210 may include support member mounting grooves 214, which are formed in the peripheral area of the upper surface of the base 210 so as to allow the elastic support members 220 to be fitted therein. Specifically, the support member mounting grooves 214 may be formed in the edge area where the upper surface of the base 210 and side surfaces of the base 210 meet. The support member mounting grooves 214 may be provided with an adhesive so as to firmly secure the elastic support members 220.

The elastic support members 220 may be fitted or disposed in the support member mounting grooves 214 and may then be secured thereto by means of an adhesive or the like. The support member mounting grooves 214 may be provided in a singular number or a plural number depending on the number of elastic support members 220. Although the support member mounting grooves 214 may have an approximately rectangular shape, the embodiment is not limited thereto.

As shown in FIG. 13, according to this embodiment, two support member mounting grooves 214 may be provided in each of four side edges of the upper surface of the base 210 such that ends of first and second support members are fitted or disposed in the support member mounting grooves 214. The number of support member mounting grooves 214 may increase or decrease depending on the shape of the elastic support members 220, and one or three or more support punting grooves 214 may be provided.

The base 210 may further be provided at the upper surface thereof with second position sensor mounting recesses 215 in which the second position sensors 240 are disposed. According to this embodiment, two second position sensor mounting recesses 215 are provided such that the second position sensors 240, disposed in the second position sensor mounting recesses 215, detect the extents by which the housing 140 moves in the second and third directions. To this end, the second position sensor mounting recesses 215 may be disposed such that imaginary lines connected between the second position sensor mounting recesses 215 and the center of the base 210 intersect each other. Although the angle defined between the imaginary lines may be 90°, the embodiment is not limited thereto.

The second position sensors 240 may be secured in the second position sensor mounting recesses 215 by injecting additional epoxy into the second position sensor mounting recesses 215. At least one surface of each of the second position sensor mounting recesses 215 may be provided with an inclined surface (not shown) so as to allow epoxy or the like for assembly of the second position sensor 240 to be more easily injected. In another embodiment, the second position sensor mounting recesses 215 may not be provided with additional epoxy or the like.

The second position sensor mounting recesses 215 may be arranged at or near the centers of the second coils 230. According to this embodiment, the second position sensor mounting recesses 215 may be disposed at the upper surface of the base 210, positioned at or near the corner portions so as to minimize interference with the elastic support members 220.

The second coils 210 may be disposed with respect to the second position sensors 240 such that the centers of the second coils 230 are aligned with the centers of respective second position sensors 240 in the direction of the optical axis or in the direction parallel to the optical axis. For example, the center of one of two second position sensors may be aligned with the center of one of four second coils in the direction of the optical axis or in the direction parallel to the optical axis.

The second coils 230 may be placed on the circuit board 250, and the second position sensors 240 may be disposed under the circuit board 250. According to this embodiment, the second position sensor 240, the second coil 230, and the first magnet 130 may be arranged on the same axis or line. The same axis or line may be parallel to the first direction, which is the direction of the optical axis.

Thanks to the above-described construction, optical image stabilization may be implemented by moving the housing 140 in the second and/or third direction using the interaction between the second coils 230 and the first magnets 130.

The cover member 300 may be provided with groove portions at areas corresponding to the stepped portions 211 of the base 210, and thus an adhesive or the like may be injected through the groove portions of the cover member 300. Here, the adhesive injected through the groove portions of the cover member 300 may have a low viscosity, and may infiltrate between the stepped portions 211 of the base 210 and the end of the cover member 300. The adhesive injected through the groove portions of the cover member 300 may fill the gap defined between the mating surfaces of the cover member 300 and the base 210, and the cover member 300 may be sealingly coupled to the base 210.

The base 210 may be provided at the lower surface thereof with a mount seat (not shown) on which a filter is mounted. Although the filter may be an infrared ray screening filter, the embodiment is not limited thereto. The filter may be installed at an additional sensor holder provided under the base 210. The base 210 may be provided at the lower surface thereof with a sensor substrate on which an image sensor is mounted so as to constitute a camera module.

The elastic support members 220 may be provided on respective ones of the plurality of lateral side surfaces of the housing 140. The elastic support members 220 may include a plurality of elastic support members 220. In this embodiment, although each of the plurality of elastic support members 220 is described as including a pair of support members, each of the elastic support members 220 may include three or more support members.

For example, when the housing 140 has a flat polygonal structure, as described above, the housing 140 has a plurality of lateral side surfaces. When the housing 140 has a flat octagonal shape as shown in FIGS. 6 and 7, the elastic support members 220 may be disposed at four lateral side surfaces selected from among eight lateral side surfaces. When the housing 140 has a flat rectangular shape, the elastic support members 220 may be disposed at the four lateral side surfaces, respectively.

Hereinafter, although the number of elastic support members 220 is described as four, as shown in FIGS. 2, 3 and 8, the embodiment is not limited thereto. Specifically, each of the first to fourth elastic support members 220-1 to 220-4 is described as being disposed at a corresponding one of the four second surfaces 142.

Figure 14:
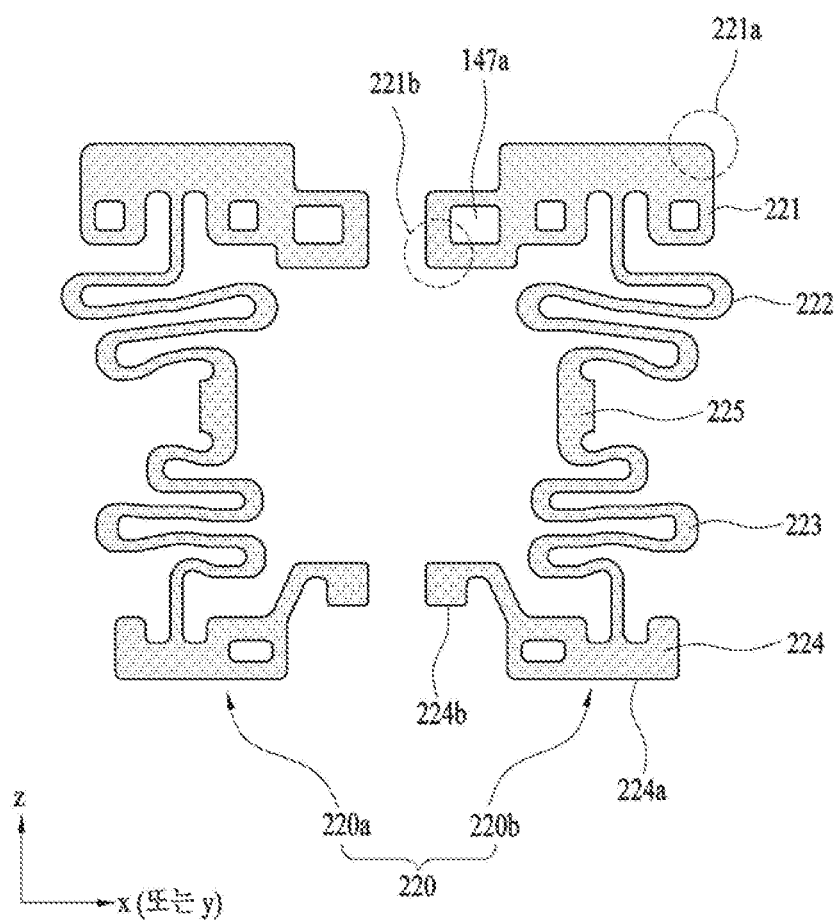
FIG. 14 is a front view of a plurality of elastic support members according to the embodiment.

FIG. 14 is a front view of the plurality of elastic support members 220 according to the embodiment.

Referring to FIGS. 8 and 14, the first to fourth elastic support members 220-1 to 220-4 may be disposed at respective ones of four second surfaces 142, among the eight lateral side surfaces of the housing 140. The elastic support members may support the housing 140 in the state of being spaced apart from the base 210 by a predetermined distance.

Since the first to fourth elastic support members 220 (220-1 to 220-4) are disposed at the respective second surfaces 142 of the housing 140, a total of four elastic support members may be symmetrically disposed with respect , one another. However, the embodiment is not limited thereto, and eight elastic support members may be provided in such a manner as to provide a pair of elastic support members to each of the second surfaces 142. The number of elastic support members disposed at each of the second surfaces 142 may be one or more.

Each of the first to fourth elastic support members 220 (220-1 to 220-4) may include first and second support members 220a and 220b, which are separated from each other.

The first elastic support member 220-1 may include a first support member 220a-1 and a second support member 220b-1, and the second elastic support member 220-2 may include a first support member 220a-2 and a second support member 220b-2. The third elastic support member 220-3 may include a first support member 220a-3 and a second support member 220b-3, and the fourth elastic support member 220-4 may include a first support member 220a-4 and a second support member 220b-4. Here, the pair of first and second support members may be disposed at the same second surface of the housing 140, and may be spaced apart from each other.

Each of the first support members 220a (220a-1 to 220a-4) and the second support members 220b (220b-1 to 220b-4) may include an upper terminal portion 221, one or more elastic deformation portions 222, 223 and 225, and a lower terminal portion 224.

The first and second support members 220a and 220b shown in FIG. 14 may be symmetrically disposed with respect to each other in the direction perpendicular to the z axis direction, which is the first direction (i.e. the x axis or y axis direction). For example, the first and second support members 220a and 220b may be horizontally disposed to be symmetric with each other with respect to the center line. The center line may be an imaginary line, which is parallel to the z axis direction, disposed between the first and second support members 220a and 220b, and positioned at the same distance from the first and second support members 220a and 220b.

The elastic support members 220-1 to 220-4 shown in FIGS. 3 and 8 may be symmetric with each other in the y axis direction or the x axis direction.

Specifically, the first and fourth elastic support members 220-1 and 220-4 shown in FIGS. 3 and 8 may be symmetric with each other in the y axis direction, perpendicular to the z axis direction, and the second and third elastic support members 220-2 and 220-3 may be symmetric with each other in the x axis direction, perpendicular to the z axis direction.

The mounting recesses 142a shown in FIGS. 6 and 7 open at bottom surfaces thereof in order to prevent the lower terminal portions 224 of the elastic support members 220 from interfering with the housing 140. As shown in FIG. 7, the mounting recesses 142a of the housing 140 may be provided at upper portions thereof with stepped portions 142b to support inner sides of the upper terminal portions 221 of the elastic support members 220.

Referring to FIGS. 3 and 4, the upper terminal portion 221 of the elastic support member 220 may be coupled to the upper end of the second surface 142 of the housing 140. The upper terminal portion 221 of the elastic support member 220 may have a coupling hole 147a corresponding to a coupling protrusion 147 formed in the second surface 142 of the housing 140. The coupling protrusion 147 of the housing 140 may be securely fitted in the coupling hole 147a of the upper terminal portion 221 of the elastic support member 220.

A portion 221a of the upper terminal portion 221. of the elastic support member 220 may be conductively connected to the support member contact of the upper elastic member 150.

According to this embodiment, the first support member contact 150a-1 of the first upper elastic member 150a may be conductively connected to the portion of the upper terminal portion 221 of the first support member 220a-1 of the first elastic support member 220-1.

The second support member contact 150b-s of the second upper elastic member 150b shown in FIG. 9 may be conductively connected to the upper terminal portion 221 of the second support member 220b-1 of the first elastic support member 220-1.

Among the first to fourth elastic support members 220-1 to 220-4, the elastic support members that are conductively connected to the first and second support member contacts 150a-1 and 150b-1 of the upper elastic member 150 serve to supply power to the first coil 120.

Like the first and second support members 220a-1 and 220b-1, which are disposed on the same second surface of the housing 140 to be adjacent to each other, the first and second support member contacts 150a-1 and 150b-1 of the first and second upper elastic members 150a and 150b may also be disposed to be adjacent to each other.

Referring to FIG. 3, the upper terminal portion 221 of the first support member 220a-1 of the first elastic support member 220-1 and the first support member contact 150a-1 of the first upper elastic member 150a may be conductively connected to each other at a first contact CP1 through soldering or the like.

Furthermore, the upper terminal portion 221 of the second support member 220b-1 of the first elastic support member 2204 and the second support member contact 150b-1 of the second upper elastic member 150b may be conductively connected to each other at a second contact CP2 through soldering or the like.

In this way, each of the first and second upper elastic members 150a and 150b, which are separated from each other, may be conductively connected to a corresponding one of the first and second support members 220a-1 and 220b-1 of the first elastic support member 220-1, and thus first and second powers (for example, currents), which are supplied from the circuit board 250 through the first and second support members 220a-1 and 220b-1, may be applied to the starting line and the ending line of the first coil 120 through the first and second upper elastic members 150a and 150b.

The upper terminal portions of the first and second support members 220a-1 and 220b-1 of the first elastic member 220-1 may include the first contact terminal portion 221a for supplying power to the first and second upper elastic members 150a and 150b. The first contact terminal portion 221a may be positioned at a corner edge of the upper terminal portion 221. However, the first contact terminal portion 221a may be provided separately from the upper terminal portion 221. The first contact terminal portion 221a of each of the first and second support members 220a-1 and 220b-1 may receive a positive (+), or negative (−) current.

The upper terminal portion 221 of the first and second support members 220a-2 and 220b-2 of the second upper elastic member 220-2 may include a second contact terminal portion 221b for connection between the first position sensor 170 and the circuit board 250. The second contact terminal portion 221b may be positioned at a lower corner edge of the upper terminal portion 221. However, the second contact terminal portion 221a may also be provided separately from the upper terminal portion 221.

The one or more elastic deformation portions 222, 223 and 225 may extend from the upper terminal portion 221 in the longitudinal direction, and may be bent at least one time to form a pattern having a predetermined shape. The longitudinal direction may refer to the connection direction between the upper terminal portion 221 and the lower terminal portion 224.

According to this embodiment, the one or more elastic deformation portions may include the first and second elastic deformation portions 222 and 223.

When the first elastic deformation portion 222 is bent two or more times to form a staggered pattern, the second elastic deformation portion 223 may also be formed in this manner. However, the embodiment is not limited thereto. In another embodiment, the second elastic deformation portion 223 may be omitted, or may be formed in a manner different from the first elastic deformation portion 222. The second elastic deformation portion shown in FIG. 14 is merely an example, and may be formed to have various patterns other than the staggered pattern. The first and second elastic deformation portions 222 and 223 may be integrally formed with each other, and may be configured to have a suspension wire without formation of the above patterns. According to this embodiment, linear sections of the first and second elastic deformation portions 222 and 223 may be formed to be almost parallel to a plane perpendicular to the optical axis.

When the housing 140 moves, the first and second elastic deformation portions 222 and 223 may be finely and elastically deformed in the moving direction of the housing 140 or in the longitudinal direction of the elastic support member 220. Consequently, the housing 140 may move in a direction substantially perpendicular to the optical axis without displacement in the first direction, which is parallel to the optical axis, thus improving the accuracy of optical image stabilization. This is obtained by the property of the elastic deformation portions 222 and 223, which are capable of being stretched in the longitudinal direction.

The one or more elastic deformation portions may further include the connection portion 225. Although the connecting portion 225 may be disposed between the first and second elastic deformation portions 222 and 223, the embodiment is not limited thereto. The connecting portion 225 may be disposed to be connected to only one elastic deformation portion. The first and second elastic deformation portions 222 and 223 may be connected to each other with the connecting portion 225 interposed therebetween, and may be configured to have shapes that correspond to each other.

The connecting portion 225 may be configured to have a plate shape so as to serve as a damper. The connecting portion 225 may have a plurality of holes (not shown) or recesses (not shown), and ultraviolet dampers or the like may be provided between the connecting portion 225 and the housing 140 through the holes or recesses to form a damping portion.

Although the first and second elastic deformation portions 222 and 223 are illustrated in the drawings as being disposed between the upper terminal portion 221 and the lower terminal portion 224, the embodiment is not limited thereto In another embodiment, each of opposite ends of each of the first and second support members 220a and 220b may be provided with one or more elastic deformation portions, unlike the configuration shown in FIG. 14.

The lower terminal portion 224 may be provided at the end of each of the first and second support members 220a and 220b. The lower terminal portion 224 may extend from the one or more elastic deformation portions 222, 223 and 225, and may be connected to the base 210.

One end of the lower terminal portion 224 may be fitted or disposed in the support member mounting groove 214 formed in the base 210, and may be securely coupled thereto by means of an adhesive member, such as epoxy. However, the embodiment is not limited thereto, and the support member mounting groove 214 in the base 210 may be configured to correspond to the lower terminal portion 224 such that the lower terminal portion 224 is fitted in the support member mounting groove 214. The one end 224a of the lower terminal portion 224 may be branched into two or more, and the base 210 may be correspondingly provided with two or more support member mounting grooves 214 for one support member.

The other end 224b of the lower terminal portion 224 may be mounted on the upper end of a pad of each of pad portions 252-1 to 252-4 of the circuit board 250, and may be connected thereto.

Although the lower terminal portion 224 may be configured to have a plate shape having a larger width than that of the first and second elastic deformation portions 222 and 223, the embodiment is not limited thereto. The lower terminal portion 224 may be configured to have a plate shape having a width equal to or less than that of the first and second elastic deformation portions 222 and 223.

The second coils 230 may be disposed to face the first magnets 130 secured to the housing 140. By way of example, the second coils 230 may be disposed outside the first magnet 130, or may be disposed spaced apart from the first magnet 130 by a predetermined distance.

According to this embodiment, although four second coils 230 may be mounted on four corner portions of the circuit board 250 as shown in FIGS. 12 and 13, the embodiment is not limited thereto. A total of two second coils, that is, one second coil for the second direction and one second coil for the third direction may be provided, or four or more second coils may also be provided.

In this embodiment, circuit patterns having the shape of the second coil 230 are formed on the circuit board 250, and then the second coils 230 are additionally disposed on the circuit board 250. However, the embodiment is not limited thereto, and the second coils 230 may be additionally disposed on the circuit board 250 alone, without formation of the circuit patterns having the shape of the second coil 230. Alternatively, the second coil 230 may be formed by winding a wire into a doughnut shape or by preparing an FP coil type second coil 230 and conductively connecting the second coil 230 to the circuit board 250.

Although a circuit member 231 including the second coils 230 may be disposed on the circuit board 250 placed on the base 210, the embodiment is not limited thereto. The second coils 230 may be closely disposed on the base 210, or may be disposed spaced apart from each other by a predetermined distance, Furthermore, the second coils 230 may be formed on an additional substrate, and the additional substrate may be layered on the circuit board 250 and connected thereto.

Thanks to the interaction between the first magnets 130 and the second coils 230, which are constructed as described above, the housing 140 may move in the second and third directions. To this end, the first to fourth elastic support members 220-1 to 220-4 may support the housing 140 in such a manner as to allow the housing 140 to move with respect to the base 210 in the second and third directions, which are perpendicular to the first direction.

The second position sensors 240 may detect the motion of the housing 140. Although the second position sensor 240 may be a Hall sensor, any sensor may be used as long as it can detect variation in magnetic force.

As shown in FIG. 13, two second position sensors 240 may be installed at the corner portions of the base 210 disposed under the circuit board 250, and may be fitted and disposed in the second position sensor mounting recesses 215 formed in the base 210. The lower surface of the circuit board 250 may be the surface opposite to the surface on which the second coils 230 are disposed.

Figure 15:
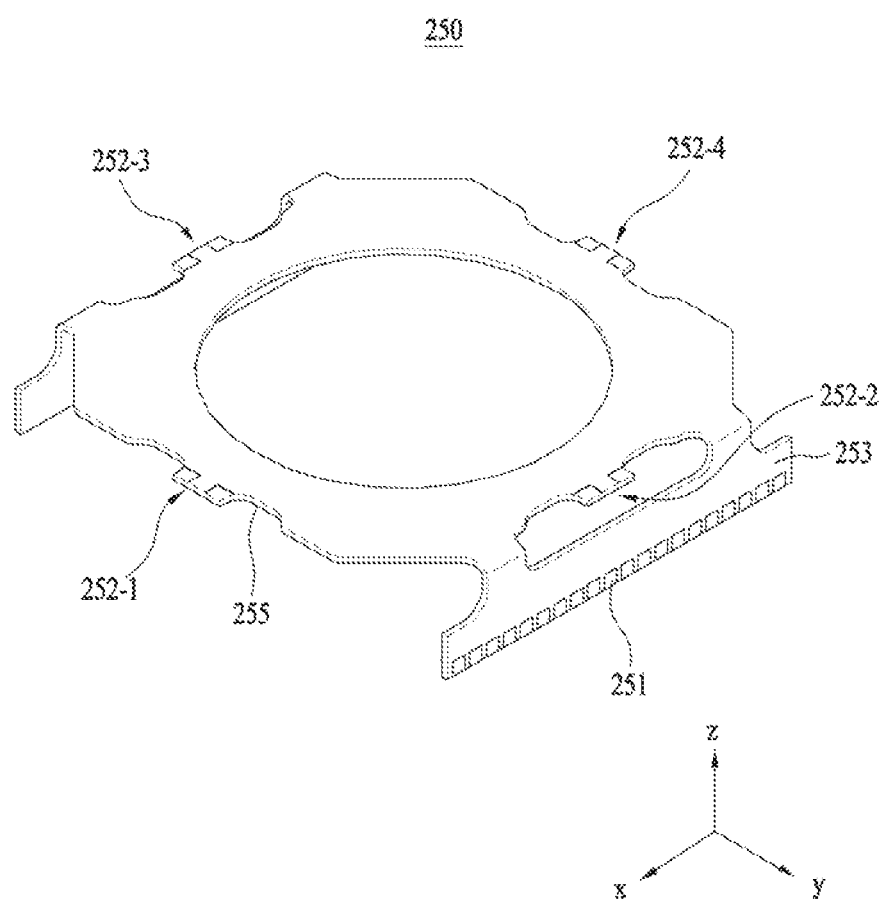
FIG. 15 is a perspective view of the circuit board according to the embodiment.

FIG. 15 is a perspective view of the circuit board 250 according to the embodiment.

Referring to FIGS. 13 and 15, the circuit board 250 may include the plurality of pad portions 252-1 to 252-4.

Each of the plurality of pad portions 252-1 to 252-4 may be connected to the other end 224b of the lower terminal portion 224 of the corresponding one of the plurality of elastic support members 220-1 to 220-4.

The other end 224b of the lower terminal portion 224 of each of the first and second support members 220a-1 and 220b-1 of the first elastic support member 220-1 may be connected to the corresponding one of the first pad portions 252-1.

The other end 224b of the lower terminal portion 224 of each of the first and second support members 220a-2 and 220b-2 of the second elastic support member 220-2 may be connected to the corresponding one of the second pad portions 252-2.

The other end 224b of the lower terminal portion 224 of each of the first and second support members 220a-3 and 220b-3 of the third elastic support member 220-3 may be connected to the corresponding one of the third pad portions 252-3.

The other end 224b of the lower terminal portion 224 of each of the first and second support members 220a-4 and 220b-4 of the fourth elastic support member 220-4 may be connected to the corresponding one of the fourth pad portions 252-4.

Each of the first to fourth pad portions 252-1 to 252-4 may include at least one pad, for example, two pads, and may be connected to the corresponding one of the first and second support members 220a and 220b of the elastic support member 220.

The circuit board 250 may include a plurality of terminals 251, and each of the plurality of terminals 251 may be conductively connected to the corresponding one of the pad portions 252-1 to 252-4.

The circuit board 250 may be coupled to the upper surface of the base 210, and may have recesses or through holes 255 at positions corresponding to the support member mounting grooves 214 so as to allow the support member mounting grooves 214 to be exposed. The circuit board 250 may have a terminal plate 253 which is bent. In this embodiment, the terminal plate 253 of the circuit board 250 may be provided with at least one terminal 251.

In this embodiment, external power may be supplied to the first and second coils 120 and 230 and the first position sensor 170 through the plurality of terminals 251 provided at the terminal plate 253 of the circuit board 250, and a signal output from the first position sensor 170 may be output to the outside as a feedback signal, which is required to control the position of the bobbin 110.

The number of terminals provided at the terminal plate 253 may increase or decrease depending on the components to be controlled.

In this embodiment, although the circuit board 250 may be embodied as an FPCB, the embodiment is not limited thereto. The terminals of the circuit board 250 may be directly formed on the base 210 through a process of forming a surface electrode.

Hereinafter, a procedure of supplying power to the first position sensor 170 and transmitting a signal output from the first position sensor 170 to the circuit board 250 through the plurality of elastic support members 220 will be described with reference to the accompanying drawings.

When the first position sensor 170 is embodied as a Hall sensor, the Hall sensor 170 may include a plurality of pins. The plurality of pins may include a first pin and a second pin.

The first pin may include a first main pin and a first subsidiary pin, which are connected to a voltage and to ground, respectively, and the second pin may include a second main pin and a second subsidiary pin for outputting the results of the detection. Although signals output through the second main pin and the second subsidiary pin may be current type signals, the embodiment is not limited to that type of signal.

According to this embodiment, it is possible to supply power to the first main pin and the first subsidiary pin of the first position sensor 170 from the circuit board 250 through the second elastic support member 220-2.

Furthermore, it is possible to transmit an output signal to the circuit board 250 from the second main pin and the second subsidiary pin of the first position sensor 170 through the third elastic support member 220-3.

The second elastic support member may be any elastic support member of the second to fourth elastic support members 220-2 to 220-4 other than the first elastic support member 220-1. The third elastic support member may be any elastic support member of the third and fourth elastic support members 220-3 and 220-4 other than the first and second elastic support members 220-1 and 220-2.

Figure 16:
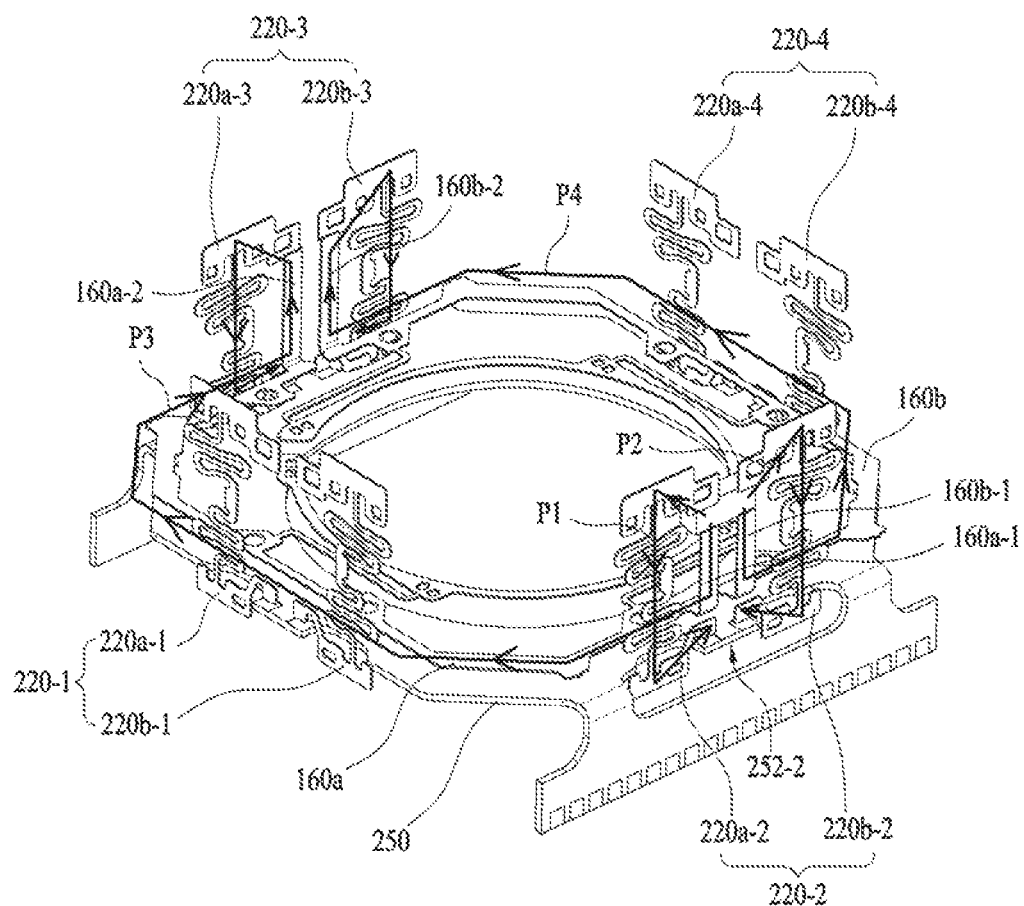
FIG. 16 is a perspective view of the lower elastic member, first to fourth elastic support members and the circuit board of the lens moving apparatus shown in FIG. 3.

FIG. 16 is a perspective view of the lower elastic member 160, the first to fourth elastic support members 220-1 to 220-4 and the circuit board 250 of the lens moving apparatus shown in FIG. 3.

The first main pin and first subsidiary pin of the first position sensor 170 may be conductively connected to the circuit board 250 through the second elastic support member 220-2.

To this end, the second contact terminal portion 221b of the upper terminal portion 221 of each of the first and second support members shown in FIG. 14 may be used. However, the embodiment is not limited thereto. In another embodiment, the upper terminal portion 221 may be connected to the first main pin and the first subsidiary pin through an element that is configured differently from the second contact terminal portion 221b.

Specifically, as shown in FIG. 3, the second contact terminal portion 221b of the upper terminal portion 221 of the first support member 220a-2 of the second elastic support member 220-2 may be conductively connected to the first main pin of the first position sensor 170 at the third contact CP3.

The second contact terminal portion 221b of the upper terminal portion 221 of the second support member 220b-2 of the second elastic support member 220-2 may be conductively connected to the first subsidiary pin of the first position sensor 170 at the fourth contact CP4.

The lower terminal portion 224 of the first support member 220a-2 of the second elastic support member 220-2 may be conductively connected to any one of the pads of the second pad portion 252-2 of the circuit board 250 at the seventh contact CP7. The lower terminal portion 224 of the second support member 220b-2 of the second elastic support member 220-2 may be conductively connected to another of the pads of the second pad portion 252-2 of the circuit board 250 at the eighth contact CP8.

Thanks to the above-mentioned connection, the first main pin and the first subsidiary pin of the first position sensor 170 may be conductively connected to the circuit board 250 through the first and second support members 220a-2 and 220b-2 of the second elastic support member 220-2.

Referring to FIG. 16, energizing paths P1 and P2 from the first main pin and first subsidiary pin of the first position sensor 170 to the second pad portion 252-2 of the circuit board 250 are illustrated.

The second main pin and second subsidiary pin of the first position sensor 170 may be conductively connected to the circuit board 250 through the first and second lower elastic members 160a and 160b and the third elastic support member 220-3.

To this end, referring to FIG. 3, the second main pin of the first position sensor 170 may be conductively connected to the end of the first main sensor contact 160a-1 of the first lower elastic member 160a at the fifth contact CP5.

The second subsidiary pin of the first position sensor 170 may be conductively connected to the end of the second sensor contact 160b-1, which is disposed at one side of the second lower elastic member 160b at the sixth contact CP6.

Referring to FIGS. 3, 8 and 16, the first main sensor contact 160a-1 of the first lower elastic member 160a may be connected to the second contact terminal portion 221b of the first support member 220a-3 of the third elastic support member 220-3 at the ninth contact CP9 through the outer frame 162 and the first subsidiary sensor member 220a-3 disposed at the other side of the first lower elastic member 160a.

The second main sensor contact 160b-1, disposed at one side of the second lower elastic member 160b, may be connected to the second contact terminal portion 221b of the second. support member 220b-3 of the third elastic support member 220-3 at the tenth contact CP10 through the outer frame 162 and the second subsidiary sensor contact 160b-2 disposed at the other side of the second lower elastic member 160b.

The lower terminal portion 224 extending from the second contact terminal portion 221b of the first support member 220a-3 of the third support member 220-3 may be connected to one of the pads of the third pad portion 252-3 of the circuit board 250. The lower terminal portion 224 extending from the second contact terminal portion 221b of the second support member 220b-3 of the third elastic support member 220-3 may be connected to another of the pads of the third pad portion 252-3 of the circuit board 250.

Accordingly, the second main pin and second subsidiary pin of the first position sensor 170 may be conductively connected to the circuit board 250 through the first and second lower elastic members 160a and 160b and the first and second support members 220a-3 and 220b-3 of the third elastic support member 220-3.

Referring to FIG. 16, energizing paths P3 and P4 from the second main pin and second subsidiary pin of the first position sensor 170 to the third pad portion 252-3 of the circuit board 250 are illustrated.

According to this embodiment, the second elastic support member 220-2, connecting the first main pin and first subsidiary pin of the first position sensor 170 to the circuit board 250, and the third elastic support member 220-3, connecting the second main pin and second subsidiary pin of the first position sensor 170 to the circuit board 250, may be symmetric with each other in the y axis direction. To this end, the second elastic support member 220-2 and the third elastic support member 220-3 may be disposed at the second surfaces of the housing 140, which are opposite to each other.

When the lens moving apparatus includes a total of four support members and power is supplied to the first coil through two of the four support members, the number of pads required in the circuit board 250 is only two. However, according to this embodiment, the number of support members is a total of eight, in which two support members are used to supply power to the first coil 120 and four support members, among the remaining six support members, are used to connect four pins of the first position sensor 170 to the circuit board 250. Accordingly, the number of pads required in the circuit board 250 may be six. According to this embodiment, as the number of support members increases, the number of pads required in the circuit board 250 may increase, and the number of terminals 251 may increase.

In the lens moving apparatus according to this embodiment, the first to fourth elastic support members 220-1 to 220-4 may include the first and second support members, which are conductively isolated.

Power may be supplied to the first coil 120 through the first elastic support member 220-1, and the upper terminal portions 221 of the first and second support members 220a-1 and 220b-1 of the first elastic support member 220-1 may be disposed on the same second surface of the housing 140 so as to be adjacent to each other.

The upper terminal portion 221 of the first support member 220a-1 may be disposed to face the first support member contact 150a-1 of the first upper elastic member 150a.

The upper terminal portion 221 of the second support member 220b-1 may be disposed so as to face the second support member contact 150a-1 and 150b-1 of the second upper elastic member 150b.

Since the first elastic support member 220-1 and the upper elastic member 150 may be disposed on the same second surface of the housing 140 and may be conductively connected to each other through soldering, the manufacturing process may be simplified much more than the case where the first and second support member contacts 150a-1 and 150b-1 are symmetrically disposed at positions spaced apart from each other by an angular interval of 180° about the bobbin 110.

When the lens moving apparatus additionally includes the first position sensor 170 in order to accurately control the position of the bobbin 110, additional components for the first position sensor 170 are not required. This is because the four pins, which are typically provided in the first position sensor 170, can be connected to the circuit board 250 using the elastic support member 220 and the lower elastic member 160, which are adopted for optical image stabilization, without using additional parts and lines. Therefore, the cost of manufacturing the lens moving apparatus according to this embodiment may be reduced, and the structure thereof may be simplified. This may also be applied to the case where another device, other than the first position sensor 170, is additionally provided for contributing to the operation of the lens moving apparatus.

The lens moving apparatus according to this embodiment may be incorporated in devices in various fields, for example, a camera module. A camera module may be applied to mobile devices, such as cellular phones.

The camera module according to this embodiment may include the lens moving apparatus according to the embodiment, the lens barrel coupled to the bobbin 110 of the lens moving apparatus, an image sensor (not shown), a printed circuit board on which the image sensor is mounted, and an optical system.

The lens barrel may be constructed as described above, and the printed circuit board may constitute the bottom surface of the camera module, starting from the area on which the image sensor is mounted. The printed circuit board may be the circuit board 250, or may be an additional board, which is different from the circuit board 250.

The optical system may include at least one lens for transmitting images to the image sensor. The optical system may be provided with an actuator module capable of fulfilling autofocusing, and optical image stabilizing functions. The actuator module for fulfilling autofocusing function may be constructed in various fashions, and mainly adopts a voice coil unit motor. The lens moving apparatus according to this embodiment may serve as an actuator module for fulfilling both autofocusing and optical image stabilizing functions.

The camera module may further include an infrared ray screening filter (not shown). The infrared ray screening filter serves to shield the image sensor against light in an infrared range. The base 210 may be provided with an additional terminal member for connection with the circuit board 250, and the terminal member may be integrally formed using a surface electrode. The base 210 may serve as a sensor holder for protecting the image sensor. In this case, although the base 210 may be provided along the lateral side surface thereof with protrusions projecting downward, these are not essential components. Although not shown in the drawings, an additional sensor holder disposed under the base 210 may fulfill the function of the protrusions.

According to the above-described embodiment, since autofocusing and optical image stabilization operations of the first and second lens moving unit 100 and 200 may be realized by sharing the first magnets 130, the number of components and the weight of the housing 140 are reduced, thus improving responsiveness. The magnet for autofocusing and the magnet for optical image stabilization may, of course, be constructed separately.

Figure 18:
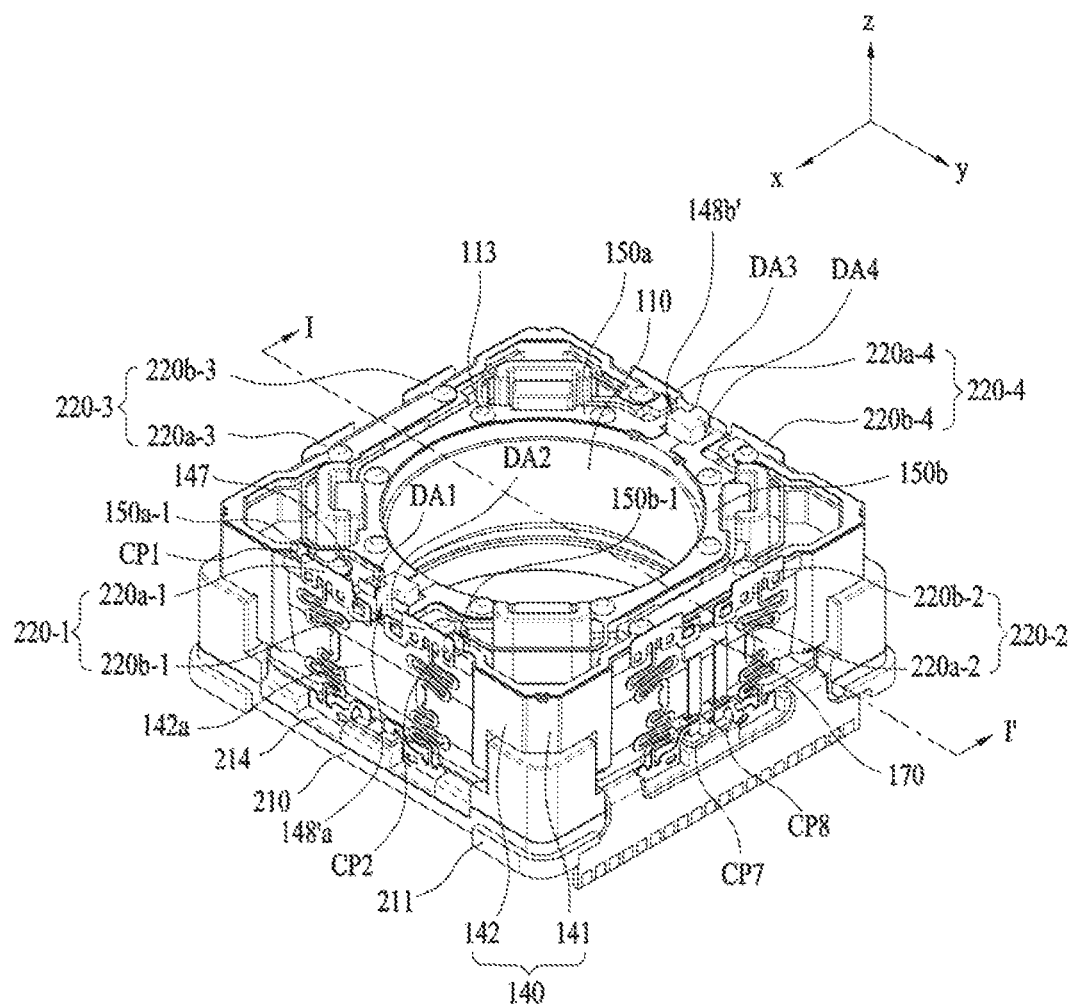
FIG. 18 is a perspective view of the lens moving apparatus according to another embodiment.
Figure 19:
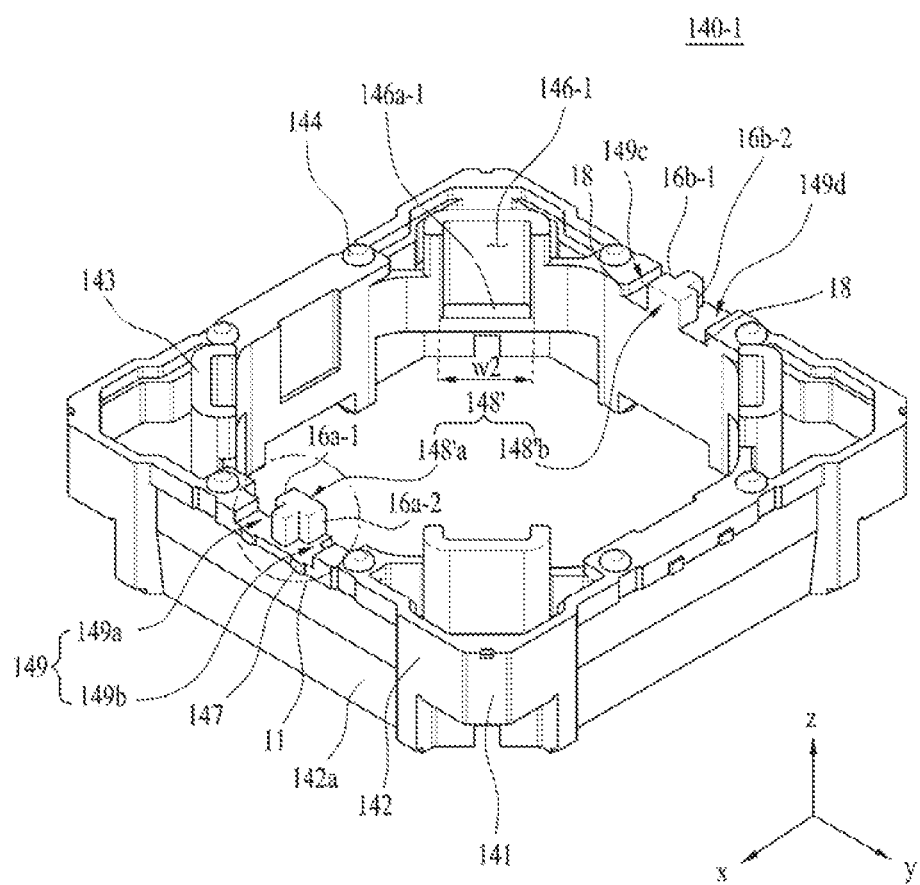
FIG. 19 is a perspective view of the housing shown in FIG. 18.
Figure 20:
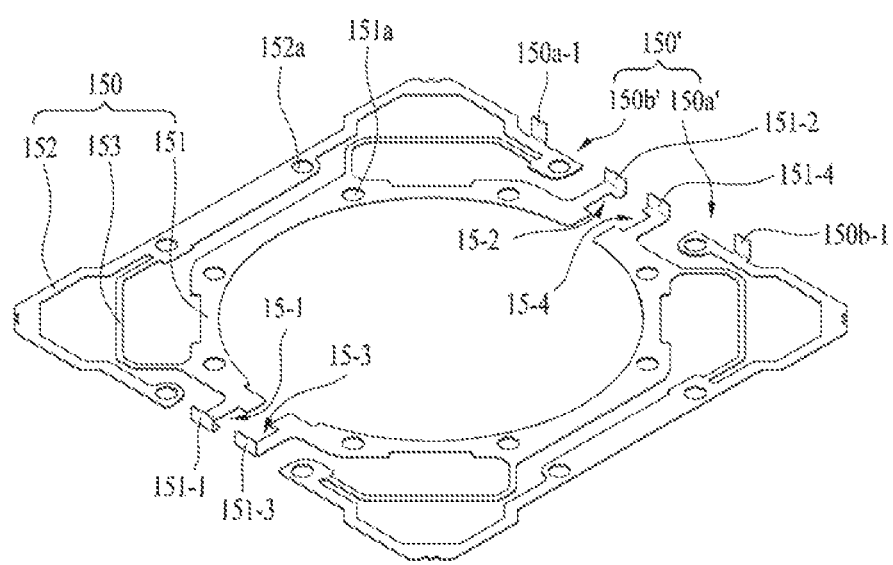
FIG. 20 is a perspective view of a first upper elastic member and a second upper elastic member.
Figure 21:
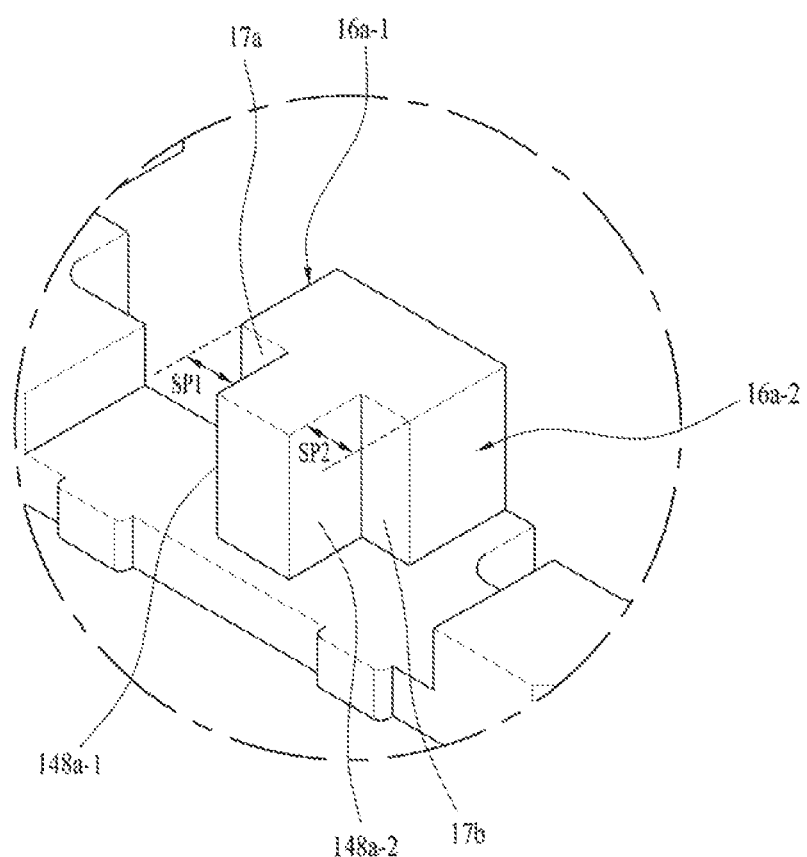
FIG. 21 is an enlarged view of a guide protrusion in the dashed circle of FIG. 19.
Figure 22:
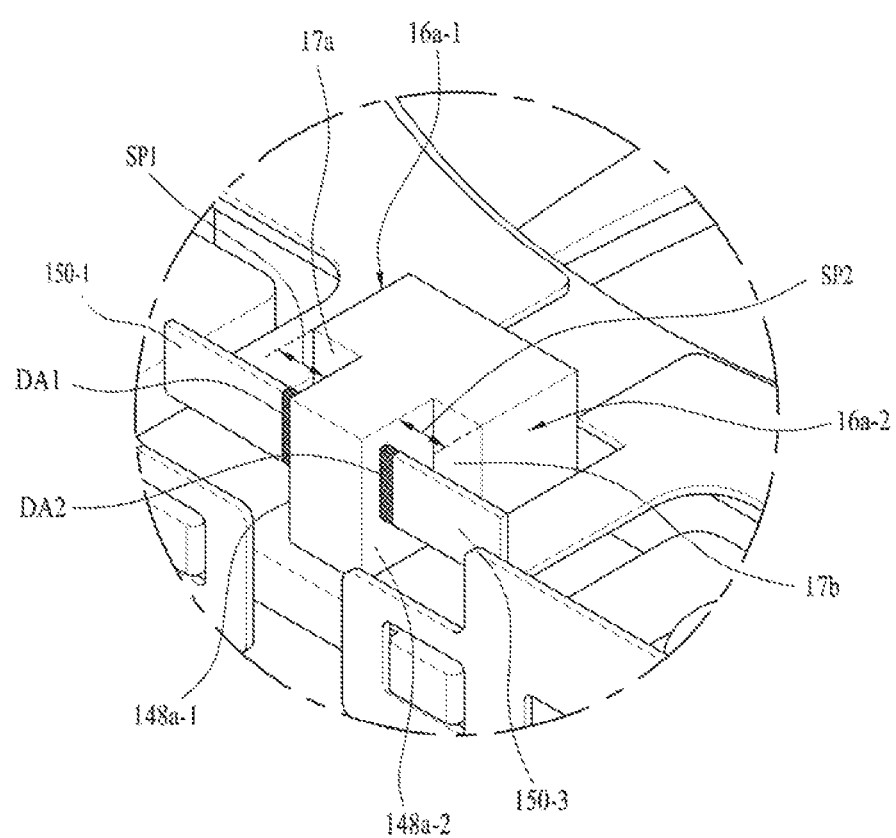
FIG. 22 is an enlarged view of the guide protrusion and the first and second upper elastic members in the dashed circle of FIG. 19.

FIG. 18 is a perspective view of a lens moving apparatus according to another embodiment. FIG. 19 is a perspective view of the housing 140-1 shown in FIG. 18. FIG. 20 is a perspective view of a first upper elastic member 150a' and a second upper elastic member 150b'. FIG. 21 is an enlarged view of a guide protrusion 148' in the dashed circle 11 of FIG. 19. FIG. 22 is an enlarged view of the guide protrusion 148' and the first and second upper elastic members 150a' and 150b' in the dashed circle of FIG. 19.

In this embodiment, the same reference numerals as those used in FIGS. 3, 6 and 9 designate the same or similar parts, and descriptions of the same or similar parts are briefly provided, or are omitted.

Referring to FIGS. 18 to 22, a housing 140-1 may include a guide protrusion 148' projecting from the upper surface thereof, a first guide groove 149a formed in the upper surface thereof positioned at one side of the first guide protrusion 148', and a second guide groove 149b formed in the upper surface thereof positioned at the other side of the first guide protrusion 148'.

The guide protrusion 148' may include a first guide protrusion 148a' and a second guide protrusion 148b'.

The difference between the guide protrusion 148 shown FIG. 6 and the guide protrusion 148' shown in FIG. 19 is that the guide protrusion 148' has first stepped portions 16a-1 and 16b-1, projecting from first side surfaces 148a-1 and 148b-1, and second stepped portions 16a-2 and 16b-2, projecting from second side surfaces 148a-2 and 148b-2. The first side surfaces 148a-1 and 148b-1 and the second side surface 148a-2 and 148b-2 may be positioned at opposite side surfaces of the guide protrusions 148a' and 148b'.

As shown in FIG. 21, the first guide protrusion 148' may include the first stepped portion 16a-1 projecting from a part of the first side surface 148a-1, and the second stepped portion 16a-2 projecting from a part of the second side surface 148a-2.

A first stepped gap SP1 may be defined in the horizontal direction between the remaining surface of the first side surface 148a-1, excluding the first stepped portion 16a-1 and the first stepped portion 16a-1, and a second stepped gap SP2 may be defined in the horizontal direction between the remaining surface of the second side surface 148a-2, excluding the second stepped portion 16a-2 and the second stepped portion 16a-2. The horizontal direction may be the direction parallel to stepped surfaces 17a and 17b, or the direction parallel to the bottoms of the first and second guide grooves 149a and 149b.

The first stepped portion 16a-1 may have the first stepped surface 17a connected to the remaining surface of the first side surface 148a-1, and the second stepped portion 16a-2 may have the second stepped surface 17b connected to the remaining surface of the second side surface 148a-2.

The damping members DA (DA1 to DA4) may be disposed between the side surfaces 148a-1 and 148a-2 and the first to fourth damping contacts 150-1 to 150-4 of the upper elastic member 150.

Specifically, the first damping member DA1 may be disposed between the first side surface 148a-1 of the first guide protrusion 148a' and the first damping contact 150-1 of the first elastic member 150a so as to contact the first side surface 148a-1 of the first guide protrusion 148a' and the first damping contact 150-1 of the first elastic member 150a. Furthermore, the second damping member DA2 may be disposed between the second side surface 148a-2 of the first guide protrusion 148a' and the third damping contact 150-3 of the second elastic member 150b so as to contact the second side surface 148a-2 of the first guide protrusion 148a' and the third damping contact 150-3 of the second elastic member 150b.

As shown in FIG. 21, the first angle defined between the remaining surface of the first side surface 148a-1 and the first stepped surface 17a may be the a right angle. However, the embodiment is not limited thereto, and the first angle may be an acute angle or an obtuse angle. For example, the first angle may be the same as the bent angle of the first damping contact 150-1 of the first upper elastic member 150a. However, the embodiment is not limited thereto.

The second guide protrusion 148b' may have the same configuration as that of the above-mentioned first guide protrusion 148a'.

The first and second stepped surfaces 17a and 17b serve to support damping materials, which are applied between the first guide protrusion 148a' and the damping contacts 150-1 and 150-3 and between the second guide protrusion 148b' and the damping contacts 150-2 and 150-4, from flowing downward.

In other words, thanks to the first and second stepped surfaces 17a and 17b, the damping members DA1 and DA2 may be easily formed between the side surfaces of the first guide protrusion 148a' and the damping contacts 150-1 and 150-3 and between the side surfaces of the second guide protrusion 148b' and the damping contacts 150-2 and 150-4.

The difference between the first and second upper elastic members 150a' and 150b' and the first and second upper elastic members 150a and 150b is that opposite ends of the first upper elastic member 150a' are provided with recesses 15-1 and 15-2 corresponding to the first and second stepped portions 16a-1 and 16a-2 of the first guide protrusion 148a'.

Specifically, the one end of the inner frame of the first upper elastic member 150a' may be provided with the first recess 15-1 corresponding to the first stepped portion 16a-1 of the first guide protrusion 148a', and the first stepped portion 16a-1 of the first guide protrusion 148a' may be fitted or disposed in the first recess 15-1.

Furthermore, the other end of the inner frame of the first upper elastic member 150a' may be provided with the second recess 15-2 corresponding to the first stepped portion 16a-1 of the second guide protrusion 148b', and the first stepped portion 16a-1 of the second guide protrusion 148b' may be fitted or disposed in the second recess 15-2.

In addition, the one end of the inner frame of the second upper elastic member 150b' may be provided with the third recess 15-3 corresponding to the second stepped portion 16a-2 of the first guide protrusion 148a', and the second stepped portion 16a-2 of the first guide protrusion 148a' may be fitted or disposed in the third recess 15-3.

Furthermore, the other end of the inner frame of the second upper elastic member 150b' may be provided with the fourth recess 15-4 corresponding to the second stepped portion 16a-2 of the second guide protrusion 148b', and the second stepped portion 16a-2 of the second guide protrusion 148b' may be fitted or disposed in the fourth recess 15-4.

By fitting the first and second stepped portions 16a-1 and 16a-2 of the first and second guide protrusions 148a' and 148b' into the first to fourth recesses 15-1 to 15-4, the damping contacts 150-1 to 150-4 of the first and second upper elastic members 150a' and 150b' may be disposed to face the remaining surface of the first and second side surfaces 148a-1 and 148a-2 of the guide protrusions 148a' and 148b'. The first to fourth recesses 15-1 to 15-4 may serve to guide the damping contacts 150-1 to 150-4 such that damping contacts 150-1 to 150-4 face the remaining surface of the first and second side surfaces 148a-1 and 148a-2.

Figure 23:
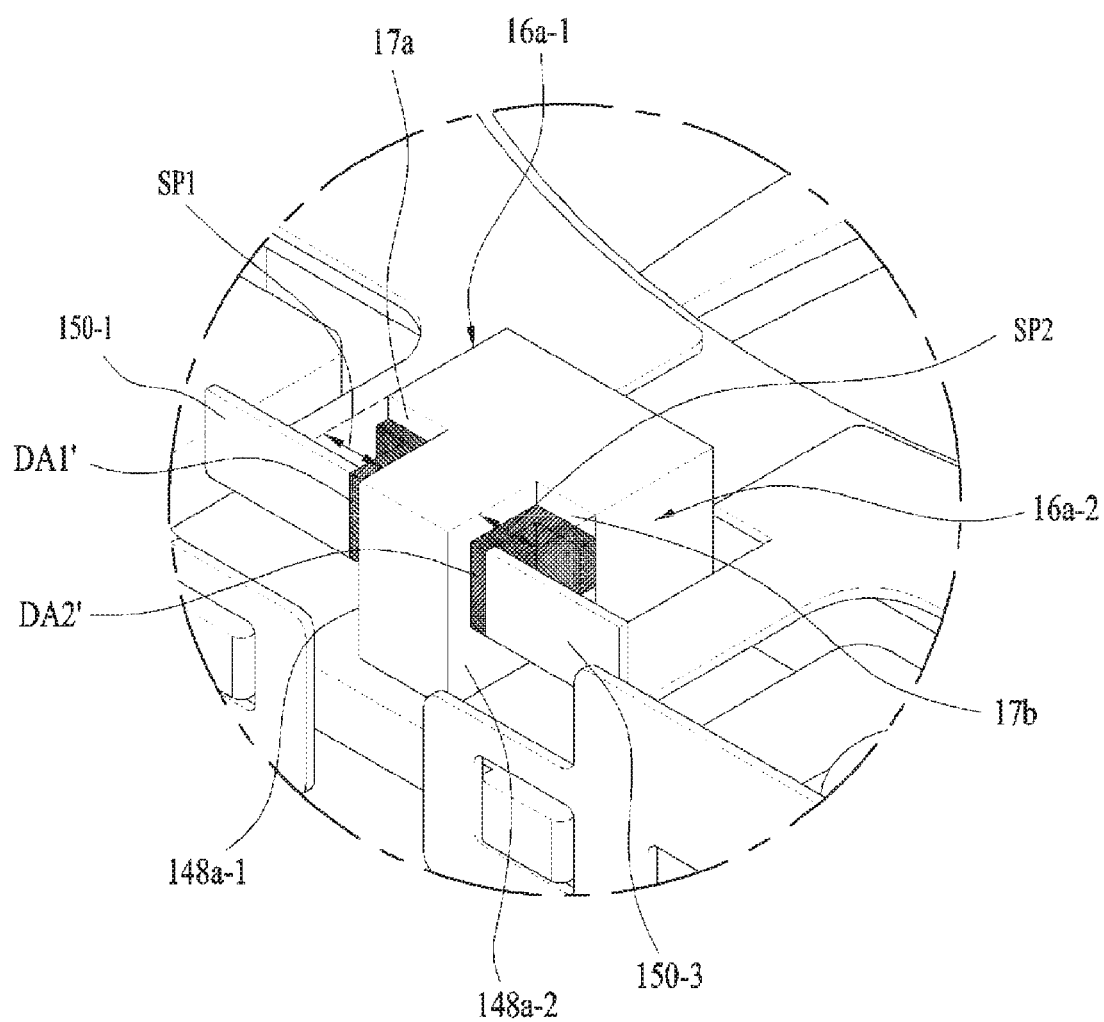
FIG. 23 is a perspective view showing another embodiment of the damping member shown in FIG. 19.

FIG. 23 illustrates another embodiment of the damping member shown in FIG. 19.

Unlike the damping member shown in FIG. 22, the damping member DA' shown in FIG. 23 may be disposed on the first and second stepped surfaces 17a and 17b as well as between the side surfaces 148a-1 and 148a-2 of the guide protrusion 148 and the first to fourth damping contacts 150-1 to 150-4, and may contact the first and second stepped surfaces 17a and 17b.

Specifically, the first damping member DA1' may contact all of the first side surface 148a-1 of the first guide protrusion 148a', the first damping contact 150-1 of the first upper elastic member 150a and the first stepped surface 17a of the first guide protrusion 148a'.

The second damping member DA2' may contact the second side surface 148a-2 of the first guide protrusion 148a', the third damping contact 150-3 of the second upper elastic member 150b and the second stepped surface 17b of the first guide protrusion 148a'.

The first and second stepped surfaces 17a and 17b may serve to guide a damping material so as to prevent the damping material from flowing out of the side surfaces of the guide protrusions 148a' and 148b' or flowing downward, whereby the damping members DA1' and DA2' are easily and stably formed between the side surfaces 148a-1 and 148a-2 of the guide protrusions 148a' and 148b' and the first to fourth damping contacts 150-1 to 150-4.

The third damping member may contact the first side surface 148a-1 of the second guide protrusion 148b', the second damping contact 150-2 of the first upper elastic member 150a and the first stepped surface 17a of the second guide protrusion 148b'.

The fourth damping member may contact the second side surface 148a-2 of the second guide protrusion 148b', the fourth damping contact 150-4 of the second upper elastic member 150b and the second stepped surface 17b of the second guide protrusion 148b'.

As is apparent from the above description, the embodiments may increase the controllable contact area of the damping members disposed between the upper elastic member and the housing, thus ensuring an accurate autofocusing operation.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
   a housing including a guide protrusion projecting from an upper surface;
   a first magnet disposed at the housing;
   a bobbin on which a lens is mounted;
   a first coil disposed at the bobbin to move the bobbin by interaction with the first magnet;
   a second magnet disposed at the bobbin;
   a first position sensor disposed at the housing;
   an upper elastic member coupled to the bobbin and the housing and disposed on the housing; and
   a damping member disposed between a side surface of the guide protrusion and a first end of the upper elastic member.

2. The lens moving apparatus according to claim 1, further comprising:
   a second coil for moving the housing by interaction with the first magnet.

3. The lens moving apparatus according to claim 1, further comprising a plurality of elastic support members including first and second support members, which are separated from each other,
   wherein power is supplied to the first coil through the first and second support members of one of the plurality of elastic support members.

4. The lens moving apparatus according to claim 2, further comprising a circuit board disposed under the second coil.

5. The lens moving apparatus according to claim 4, further comprising a second position sensor disposed under the circuit board.

6. The lens moving apparatus according to claim 1, further comprising:
   a lower elastic member coupled to the bobbin and the housing and disposed under the housing.

7. The lens moving apparatus according to claim 5, further comprising:
   a base disposed under the circuit board,
   wherein the position sensor is disposed on an upper surface of the base.

* * * * *